United States Patent [19]

Lubowitz et al.

[11] Patent Number: 4,980,481
[45] Date of Patent: Dec. 25, 1990

[54] END-CAP MONOMERS AND OLIGOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 167,597

[22] Filed: Mar. 14, 1988

Related U.S. Application Data

[60] Continuation-in-part of Ser. No. 816,489, Jan. 6, 1986, Pat. No. 4,739,030, which is a continuation-in-part of Ser. No. 704,475, Feb. 22, 1985, abandoned, which is a division of Ser. No. 505,348, Jun. 17, 1983, Pat. No. 4,536,559.

[51] Int. Cl.$^5$ ............................................. C07D 209/56
[52] U.S. Cl. ..................................... 548/435; 548/451; 548/455; 548/476; 548/524; 548/547
[58] Field of Search ................ 528/353; 548/435, 451, 548/455, 476, 524, 547

[56] References Cited

U.S. PATENT DOCUMENTS 3,699,074 10/1972 Lubowitz et al. ...................... 528/86
4,536,559 8/1985 Lubowitz et al. .................... 528/172

*Primary Examiner*—Morton Foelak
*Attorney, Agent, or Firm*—Senniger, Powers, Leavitt and Roedel

[57] ABSTRACT

High performance composites can be made from linear or multidimensional oligomer or blends that include unsaturated hydrocarbon crosslinking functionalities linked to a pyrimidine radical on the terminal ends of the polymeric backbones of the oligomers. The oligomers are made by condensing pyrimidine-based end-cap monomers of the formula:

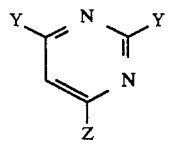

wherein
Z=—OH or halogen;
Y=

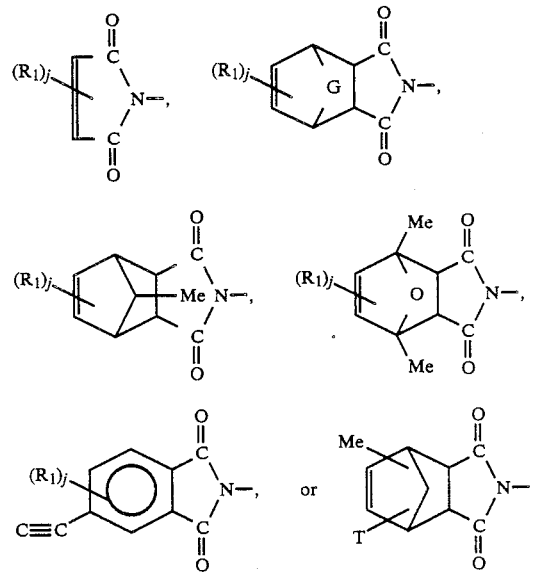

wherein
$R_1$=lower alkyl, lower alkoxy, aryl, aryloxy, substituted alkyl, substituted aryl, halogen, or mixtures thereof;
j=0, 1, or 2;
G=—$CH_2$—, —O—, —S—, —SO—, —CO—, —CHR—, —$CR_2$—, or —$SO_2$—;
T=methallyl or allyl;
Me=methyl; and
R=hydrogen, lower alkyl, or phenyl,
with suitable polymeric precursors.

17 Claims, No Drawings

END-CAP MONOMERS AND OLIGOMERS

REFERENCE TO RELATED APPLICATIONS

The present application is a continuation-in-part application based upon U.S. Ser. No. 816,489, entitled: 'Difunctional End-Cap Monomers,' filed Jan. 6, 1986, now U.S. Pat. No. 4,739,030, which was a continuation-in-part application based upon U.S.S.N. 704,475, filed Feb. 22, 1985, now abandoned, which was a divisional application based upon U.S.S.N. 505,348, filed June 17, 1983, now U.S. Pat. No. 4,536,559.

TECHNICAL FIELD

The present invention pricipally relates to pyrimidine-based end-cap monomers that provide two crosslinking sites for preparing high performance oligomers and blends and allowing the preparation of solvent-resistant advanced composites.

BACKGROUND OF THE INVENTION

Recently, chemists have sought to synthesize oligomers for high performance advanced composites suitable for aerospace applications. These composites should exhibit solvent resistance; be tough, impact resistant, and strong; be easy to process and be thermoplastic. Oligomers and composites that have thermo-oxidative stability and, accordingly, can be used at elevated temperatures are particularly desirable.

While epoxy-based composites are suitable for many applications, their brittle nature and susceptibility to thermal or hydrolytic degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°–625° F., since they have glass transition temperatures of about 690° F. PMR-15, however, suffers from brittleness.

There has been a progression of polyimide sulfone compounds synthesized to provide unique properties or combinations of properties. For example, Kwiatkowski and Brode synthesized maleic-capped linear polyarylimides as disclosed in U.S. Pat. No. 3,839,287. Holub and Evans synthesized maleic- or nadic-capped, imido-substituted polyester compositions as disclosed in U.S. Pat. No. 3,729,446. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and 'star' or 'starburst' multidimensional oligomers. We have shown surprisingly high glass transition temperatures yet reasonable processing and desirable physical properties in many of these oligomers and their composites.

Polybenzoxazoles, such as those disclosed in our copending applications U.S.S.N. 116,592 (to Lubowitz & Sheppard) and 121,964 (to Lubowitz, Sheppard, and Stephenson), may be used at temperatures up to about 750°–775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in our copending applications U.S.S.N. 810,817 and 000,605, are easier to process than some advanced composite oligomers since they can be handled at lower temperatures. Upon curing, however, the oligomers crosslink (homopolymerize) through their end caps so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are often unsatisfactory, also, since the resins often are semicrystalline which may makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester group contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, end capped polyester imide ether sulfone oligomers that have an acceptable combination of solvent resistance, toughness, impact resistance, strength, case of processing, formability, and thermal resistance. By including Schiff base (—CH=N—), imidazole, thiazole, or oxazole linkages in the oligomer chain, the linear, advanced composites formed with polyester oligomers of our copending application U.S.S.N. 726,259 can have semiconductive or conductive properties when appropriately doped.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) ease of processing, (5) impact resistance (and other matrix stress transfer capabilities), (6) retention of properties over a broad range of temperatures, and (7) high temperature resistance that is desirable on aerospace advanced composites. The prior art composites are often too brittle.

Thermally stable multidimensional oligomers having semiconductive or conductive properties when doped with suitable dopants are also known and are described in our copending applications (including U.S.S.N. 773,381 to Lubowitz, Sheppard and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap (i.e. an end cap having one or two crosslinking functionalities) to allow controlled crosslinking upon heat-induced or chemically-induced curing. Other 'semiconductive' oligomers are described in our other copending applications.

Polyamide oligomers and blends are described in our copending applications U.S.S.N. 046,202 and 051,884, and polyetherimide oligomers and blends are described in our copending application U.S.S.N. 016,703.

Polyamideimides are generally injection-moldable, amorphous, engineering thermoplastics which absorb water (swell) when subjected to humid environments or immersed in water. Polyamideimides are generally described in the following patents: U.S. Pat. Nos. 3,658,938; 4,628,079; 4,599,383; 4,574,144; or 3,988,344. The thermal integrity and solvent-resistance can be greatly enhanced by capping amideimide backbones with monomers that present one or two crosslinking functionalities at each end of the oligomer, as described in our copending application U.S.S.N. 092,740.

In all of these cases, the advantages are achieved by use of unsaturated hydrocarbon radicals at the ends of the polymeric backbones, which crosslink by addition polymerization when the oligomers are cured. The radicals (D) generally are selected from the group consisting of:

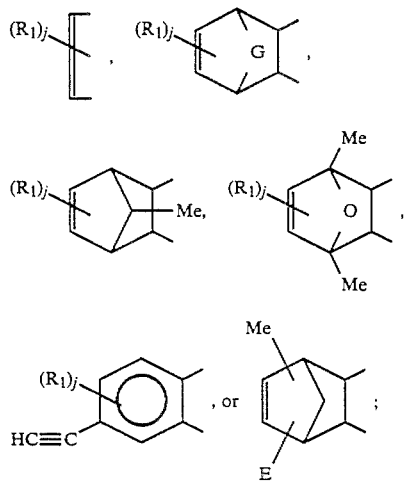

wherein
$R_1$ = lower alkyl, lower alkoxy, aryl, substituted aryl, substituted alkyl (including hydroxyl or halo substitutents), aryloxy, halogen, or mixtures thereof;
j = 0, 1, or 2;
Me = methyl;
G = —$SO_2$—, —$CH_2$—, —S—, —O—, —CO—, —SO—, —CHR—, or —$CR_2$— (preferably —$CH_2$— or —O—);
E = methallyl or allyl; and
R = hydrogen, lower alkyl, or phenyl.

The radicals can be the residue of an anhydride that is reacted with an amino-terminated polymeric backbone (or be included in the reaction mixture of polymeric precursors used for synthesizing such a backbone) or can be condensed with aminophenol, nitroaniline, aminobenzoic acid, diaminophenol, diaminobenzoic acid or the like to form a mono- or difunctional end-cap monomer.

SUMMARY OF THE INVENTION

We have found that high performance oligomers useful in aerospace applications can also be prepared using a pyrimidine radical in place of the phenyl radical in the end-cap monomers that we have customarily used. The end cap monomers have the formula $Y_i$—Ar—B wherein
Y is selected from the group consisting of:

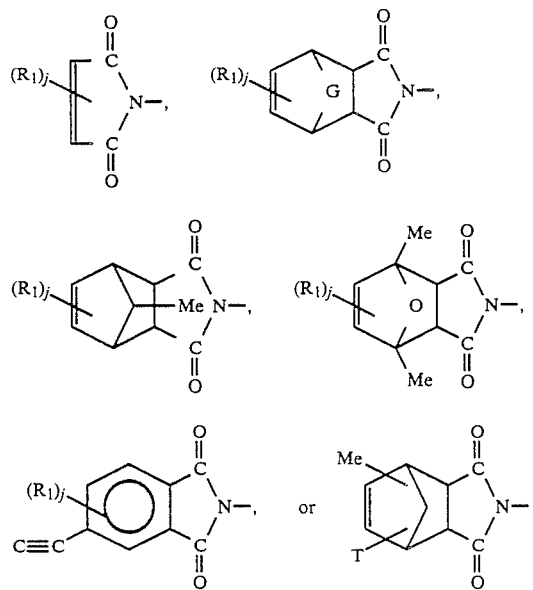

i is 2,
Ar is

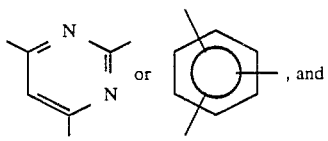

and
B is —OH or halogen.

In this regard, the anhydrides can be condensed with a hydroxy and/or haloaryl compound of the formula:

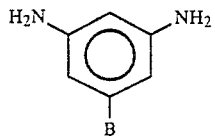

wherein B is —OH or —X, and X is halogen, or with a pyrimidine of the general formula:

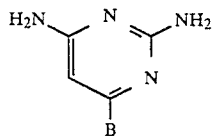

(as where B is —OH or —X and X is halogen described in U.S. Pat. No. 3,461,461) to form difunctional pyrimidine-based or other trivalent aryl end-cap monomers that include an active —OH functionality, such end-cap monomers being analogous to the difunctional end-cap imidophenols described in U.S. patent application Ser. No. 819,489, now U.S. Pat. No. 4,739,030.

Corresponding pyrimidine-based end-cap monomers having an active halogen functionality can be prepared from the corresponding halogen-substituted pyrimidine.

These pyrimidine-based end-cap monomers can be condensed with suitable reactants to form high performance oligomers such as ethers or esters, as will be explained. The oligomers can be processed into prepregs and composites the prepregs or composites may include additional coreactants or noncrosslinking, compatible polymers.

BEST MODE CONTEMPLATED FOR CARRYING OUT THE INVENTION

The pyrimidine-based end-cap monomers of the present invention are prepared by condensing an anhydride of the general formula:

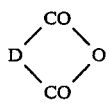

wherein
D =

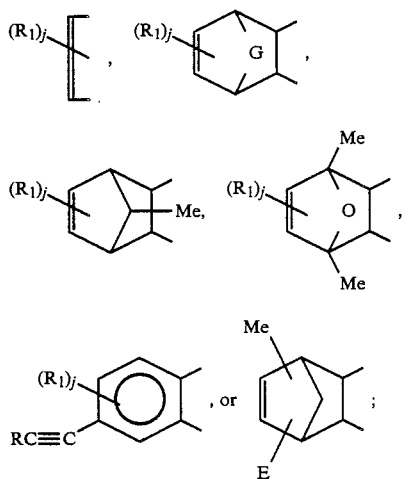

wherein
$R_1$ = lower alkyl, lower alkoxy, aryl, substituted aryl, substituted alkyl (including hydroxyl or halo substitutents), aryloxy, halogen, or mixtures thereof;
j = 0, 1, or 2;
Me = methyl;
G = —$SO_2$—, —$CH_2$—, —S—, —O—, —CO—, —SO—, —CHR—, or —$CR_2$— (preferably —$CH_2$— or —O—);
E = methallyl or allyl; and
R = hydrogen, lower alkyl, or phenyl,
with a pyrimidine of the formula:

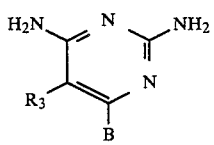

wherein
B = —OH or halogen (preferably, chlorine); and
$R_3$ = hydrogen, lower alkyl, or aryl (and, preferably, hydrogen)

The products are counterparts of the difunctional imidophenol end-cap monomers described in U.S. Pat. No. 4,739,030, made by condensing the anhydrides with diaminophenol, in the manner described in U.S. Pat. No. 4,604,437 with respect to the allyl- or methallyl-substituted methylbioyolo[2.2.1]hept-5-ene-2,3-dioarboximides. A phenyl counterpart of the halopyrimidine cap can be made using a halosubstituted diaminobenzene.

The aromatic character of the pyrimidine ring should provide substantially the same benefits as the phenyl ring. The thermo-oxidative stability of the resulting composites, however, might be somewhat less than that achieved for the phenyl end cap monomers.

The halo-substituted end cap monomers can be used in condensations with hydroxyl groups to form ether linkages. The hydroxyl-substituted end cap monomers can be used in condensations with halo-, nitro-, or acid halide groups to form ether or ester linkages. For example, the halo-substituted pyrimidine end cap monomer might be reacted with phloroglycinol to form an ether, 'star burst', multidimensional oligomer. The hydroxyl-substituted pyrimidine end cap might similarly be condensed with a dicarboxylic acid chloride (i.e. dibasic acid chloride) and a dialcohol (i.e. diol, bisphenol, or dihydric phenol) to form a linear polyester oligomer.

The pyrimidine-based oligomers can be used in advanced composite (mixed chemical) blends that comprise a mixture of a crosslinking oligomer from one chemical family, generally selected from the group consisting of:
imidesulfone;
ether
ethersulfone;
amide;
imide;
ester;
estersulfone;
etherimide;
amideimide;
oxazole;
oxazole sulfone;
thiazole;
thiazole sulfone;
imidazole; and
imidazole sulfone,
and a noncrosslinking polymer from a different chemical family. Coreactants may be included in the blends, or they may comprise mixtures of three or more oligomers/polymers, as will be explained. Because the oligomer's average formula weight will appreciably increase upon curing, generally the average formula weight of the polymer in the uncured blend will be greater than that of the oligomer. For example, a linear oligomer may have an average formula weight of about 500-5000 while the corresponding polymer has an average formula weight of about 20,000-40,000. Upon curing, the oligomer and polymer will generally have average formula weights that are closer because of addition polymerization of the oligomer. Therefore, the problems sometimes encountered with blends having components of widely different average formula weight are not as pronounced in the advanced composite composites of the present invention.

Advanced composite blends allow tailoring of the properties of high performance composites. They allow averaging of the properties of resins (i.e. oligomers or polymers) from different chemical families to provide composites that do not have as severe shortcomings as the pure compounds. For example, the rigid nature of heterocycles (oxazole, thiazole, or imidazole) can be reduced by an advanced composite blend comprising a heterocycle oligomer and an ethersulfone polymer. The resulting composite will have a use temperature (thermo-oxidative stability) higher than pure ethersulfone and a flexibility greater than the pure heterocycle. Accordingly, the resulting composites have a blending or averaging of physical properties, which makes them candidates for particularly harsh conditions.

Particularly preferred oligomer/polymer combinations include:
amideimide/imide;
amideimide/imidesulfone;
amideimide/heterocycle;
amideimide/heterocycle sulfone;
imide/heterocycle;
imidesulfone/heterocycle;
imide/heterocycle sulfone;
imide/amide;
imidesulfone/amide;
ester/amide;
estersulfone/amide;
ester/imide;
ester/imidesulfone;
estersulfone/imide; or
estersulfone/imidesulfone.
In each case the oligomer can be either component in the mixture.

Linear oligomers have the general formula:

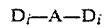

wherein
i = 1 or 2;
A = a hydrocarbon residue, preferably from one of the families previously described and having an aromatic, aliphatic, or aromatic and aliphatic backbone; and
D = an unsaturated hydrocarbon radical that is suitable for crosslinking, and generally includes the residue of a pyrimidine-based end cap that has previously been described.

The oligomeric component of an advanced composite blend may itself be a coreactive oligomer blend rather than a single oligomeric component. That is, the oligomer may include two precursors that polymerize to form block copolymers upon curing through mutually reactive end caps on the respective precursors. The resulting composites include a mix of addition polymers created by crosslinking chain extension and block copolymers formed through a resin interlinking reaction. The linear coreactive oligomer blends generally include at least one oligomer of the general formula:

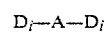

wherein
i = 1 or 2;
A = a hydrocarbon backbone; and
D = an unsaturated hydrocarbon residue as previously described, but perferably one selected from the group consisting of:

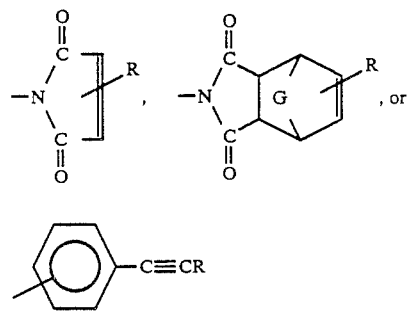

$G = -SO_2-$, $-S-$, $-O-$, $CO-$, or $-CH_2-$; and
R = hydrogen, lower alkyl, or phenyl
and another oligomer of the general formula:

wherein
i = 1 or 2;
B = a hydrocarbon backbone that is from the same or a different chemical family as A; and
Z = a hydrocarbon residue including a segment selected from the group consisting of:

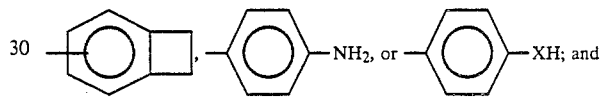

$X = -O-$ or $-S-$.

The backbones (A or B) in this circumstance of coreactive oligomer blends, as with the pure component oligomers, are generally individually selected from the group consisting of:
imidesulfones;
ethersulfones;
amides;
ethers;
esters;
estersulfones;
imides;
etherimides;
amideimides;
oxazoles;
thiazoles;
imidazoles, or
heterocycle (i.e. oxazole, thiazole imidazole) sulfones;
and generally include only aromatic (typically phenyl) radicals between linkages, although they may have other aromatic, aliphatic, or aromatic and aliphatic radicals. Although this description will primarily describe para isomers of these backbones, other isomers (particularly meta) can be used. The aromatic radicals in the backbones may include nonreactive substituents in some cases.

Linear oligomers of the general formula: $D_i-A-D_i$, or $Z_i-B-Z_i$ are preferably prepared by simultaneously condensing suitable end cap monomers with the monomer reactants (i.e. polymeric precursors) that are commonly used to form the desired backbones. For example, an imide or an imidesulfone is prepared by reacting an amine end cap monomer with a diamine and a dianhydride in accordance with the method described in U.S. Pat. No. 4,584,364. Ethersulfones or ethers can be prepared by reacting a halo- or hydroxyl end cap monomer with a suitable dialcohol (i.e. diol, bisphenol, or dihydric phenol) and a dihalogen as described in U.S. Pat. No. 4,414,269 or by other ether condensation reactions.

An amine pyrimidine-based end cap monomer can be prepared by reacting aminophenol with the halo-substituted end cap, or the reaction mixture can include about 2 moles of the halo-pyrimidine end cap, about 2 moles of aminophenol, about m moles of diamine, and about m+1 moles dianhydride wherein m=a small integer, generally from about 1-5. Alternatively, the hydroxyl-substituted pyrimidine end cap can be reacted with nitroaniline, aminobenzoic acid, or aminobenzoic acid chloride to provide a reactive amine functionality. Again, the reaction mixture might simply include the hydroxyl-substituted pyrimidine end cap, the aminobenzoic acid chloride, the diamine, and the dianhydride, although stepwise reaction is preferred to avoid the side reaction of the acid halide and diamine.

The end cap monomers generally are selected from the group previously described, wherein, for coreactive blends, the radical preferably is:

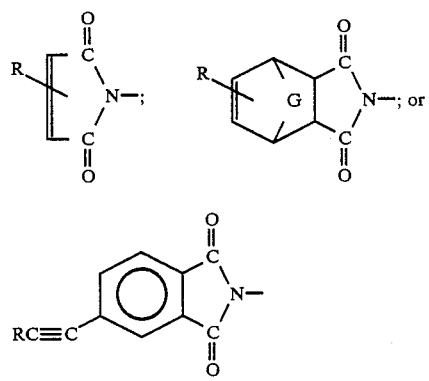

wherein
i=1 or 2;
G=—SO$_2$—, —S—, —O—, —CO—, —CH$_2$—, —SO—, —CHR—, or —CR$_2$—;
R=hydrogen, lower alkyl, or phenyl;
W=—OH, or —X; and
X=halogen.

Similarly, the end cap monomers for the Z$_i$—B—Z$_i$ oligomers generally are selected from the group consisting of aminophenol, aminobenzoic acid halide, H$_2$N-φ-SH, 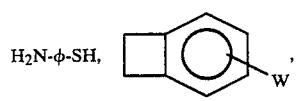

or the like, wherein φ=phenyl and W=—OH, —NH$_2$, or —COX.

Upon curing, each oligomer in the coreactive oligomer blends addition polymerizes by crosslinking and forms block copolymers through the Michaels addition reaction between the hydrocarbon unsaturation of one oligomer and the amine, hydroxyl, or sulfhydryl group of the other. The reaction of the hydrocarbon unsaturation of one oligomer with

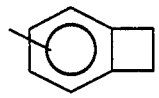

functionality of the other follows the mechanism described in U.S. Pat. No. 4,719,283 to form a cyclohexane linkage by bridging across the double bond. With the acetylene (triple) unsaturation, a cyclohexene linkage would result.

The Michaels addition reaction is illustrated as follows:

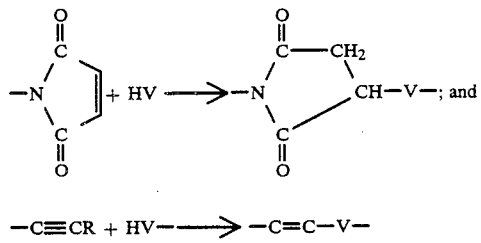

wherein V=—NH—, —O—, or —S—. For the other end caps, a reverse Diels-Alder decomposition reaction (induced by heating the oligomers) results in the formation of a reactive maleic moiety and the off-gassing of a cyclopentadiene. The methylene bridge decomposes to the maleic compound at about 625°–670° F. (330°–355° C.) while the —O— bridge decomposes at the lower temperature of about 450° F. (230° C.).

The reactive group might also be —CNO instead of the amine, but we do not recommend use of this compound.

All reactions used in the preparation of the oligomers should be carried out in suitable solvents and under an inert atmosphere. To prepare imide or imidesulfones, then, of the general formula D$_i$—A—D$_i$, or Z$_i$—B—Z$_i$, the respective amine end cap preferably is mixed with a diamine and a dianhydride. To prepare ethers or ethersulfones, the respective hydroxy end cap is mixed with suitable dialcohols (i.e., diols) and dihalogens or dinitro compounds. To prepare amides, the respective amide or acid halide end cap is mixed with suitable dicarboxylic acid halides and diamines. To prepare esters or estersulfones, the respective hydroxy or acid halide end cap is mixed with suitable dialcohols and dicarboxylic acid halides.

To prepare etherimides, the halo-substituted pyrimidine cab be used or respective amine end caps are reacted with:

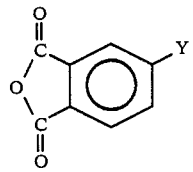

wherein Y=nitro- or halo- (i.e. nitrophthalic anhydride or halophthalic anhydride) to form an imide while leaving an active nitro- or halo-functionality. This intermediate is then mixed with suitable nitro/anhydrides and compounds of the formula: H$_2$N—R—XH, as suggested in our copending patent application No. 016,703 or U.S. Pat. Nos. 3,847,869 or 4,107,147.

To prepare amideimides, the method of our copending U.S. patent application Ser. No. 092,740 is used, which comprises condensing simulteneously an amine or acid halide end cap with suitable dicarboxylic acid halides (i.e. diacid halide or dibasic acid halide) and diamines, wherein either or both of the diamines or diacid halide include intermediate imide linkages. Alternatively, the amideimides can be prepared by condensing the respective amine end cap with suitable dianhydrides and diamines, wherein either or both of the dianhydrides or diamines include amide linkages.

Heterocycle or heterocycle sulfone oligomers (i.e. oxazole, thiazoles, or imidazoles) are prepared by condensing acid halide end caps with four-functional compounds, like diaminodihydroxybenzene, and dicarboxylic acid halides (or the acids).

Pyrimidine-based acid halide end cap monomers can be prepared by condensing nitrobenzoic acid halide with the hydroxyl-substituted monomer to form an extended ether pyrimidine monomer having an active acid halide functionality.

The synthesis of these oligomers and the representative classes of reactants will now be presented in greater detail to illustrate the scope of the invention and to describe the nature of the preferred reactants.

Amideimides are characterized by backbones of two general types, namely:

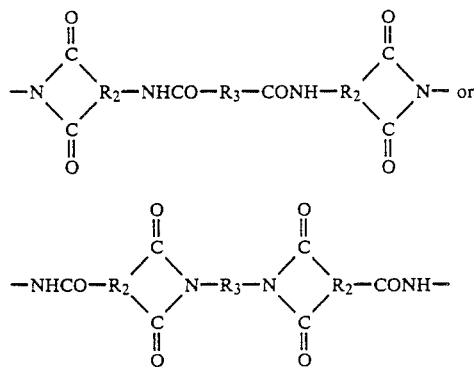

wherein
$R_3$ = an aromatic, aliphatic, or alicyclic radical, and preferably a phenoxyphenyl sulfone; and
$R_2$ = a trivalent organic radical, and preferably phenyl.

Accordingly, linear polyamideimides include oligomers of the general formula:

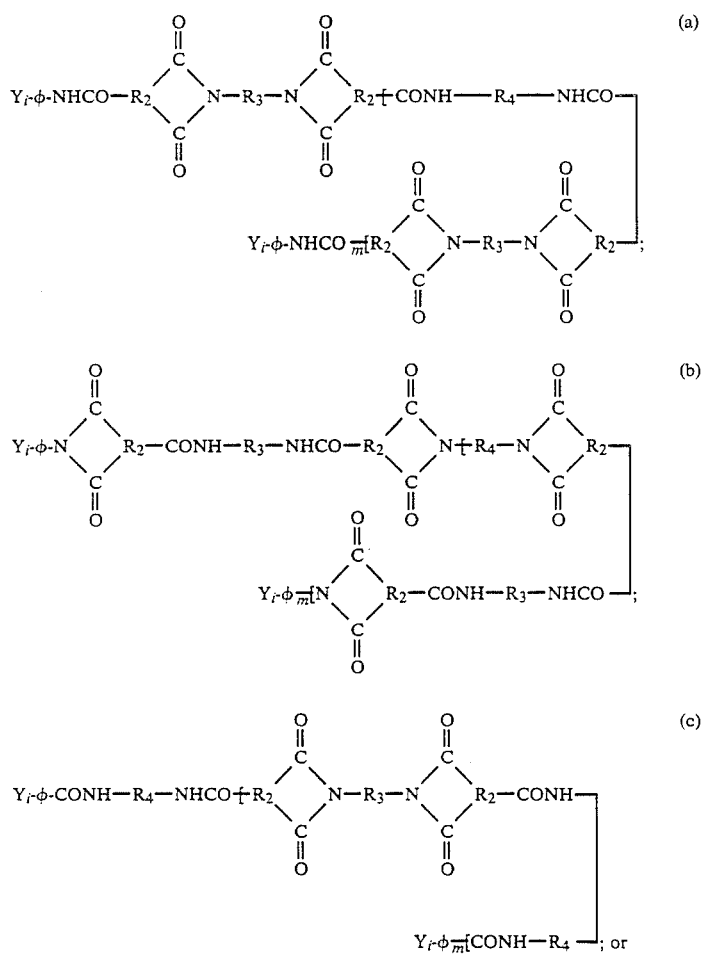

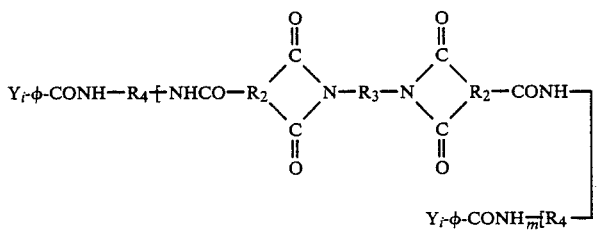 (d)

wherein
Y=an end cap residue that includes a D or Z radical;
$R_2$=a trivalent organic radical, and preferably phenyl;
$R_3$=an aromatic, aliphatic, or alicyclic radical, and preferably a phenoxyphenyl sulfone.
$R_4$=a divalent organic radical;
M=a small integer, usually from 0-5, but generally sufficiently large to impart thermoplastic properties in the oligomer;
φ=phenyl; and
i=1 or 2.

The amideimides are generally made by condensing suitable end cap monomers, diacid halides, diamines, and dianhydrides. The diacid halides can be prepared by condensing 2 moles of an acid halide anhydride of the formula:

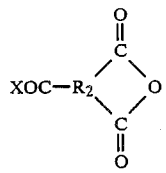

with a diamine of the formula: $H_2N-R_3-NH_2$. The diamine, in this case, can be selected from the group consisting of:

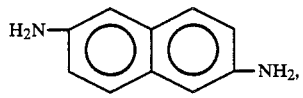

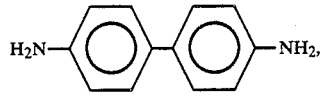

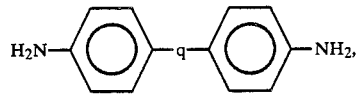

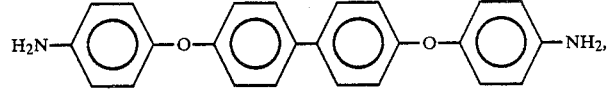

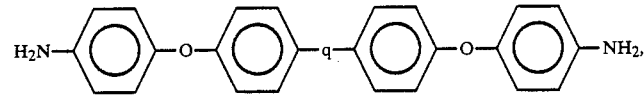

-continued

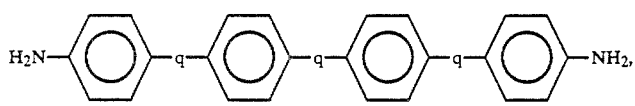

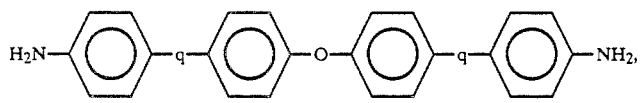

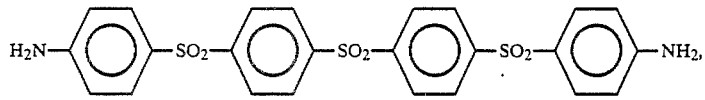

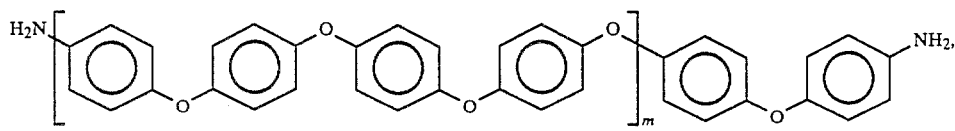

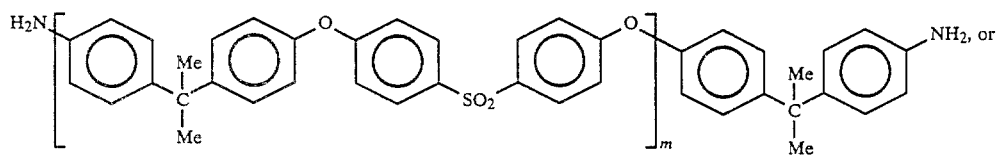

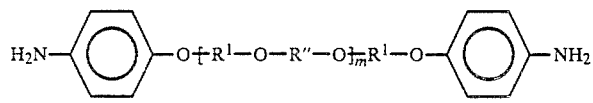

wherein
R¹ =

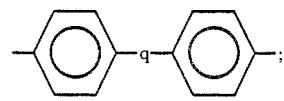

R'' =

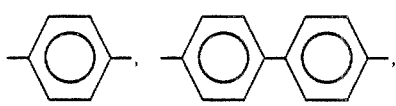

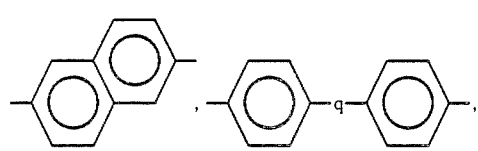

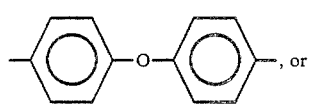, or

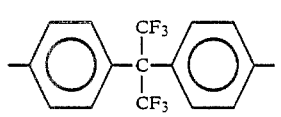

q = —SO₂—, —CO—, —S—, or —(CF₃)₂C—;
Me = methyl;
m = a small integer; and
D = —CO—, —SO₂—, —(CF₃)₂C— or mixtures thereof.

Other diamines that may be used, but that are not preferred, include those described in U.S. Pat. Nos. 4,504,632; 4,058,505; 4,576,857; 4,251,417; and 4,215,418. The aryl or polyaryl 'sulfone' diamines previously described are preferred, since these diamines are soluble in conventional synthetic solvents and provide high thermal stability to the resulting oligomers and composites.

Diamines may include 'Schiff base' conductive linkages (particularly —N=CH—), analogous to diacid halides which will be described.

Particularly preferred ethersulfone (i.e. phenoxyphenyl sulfone) diamines are those in which R₁ is and R'' is

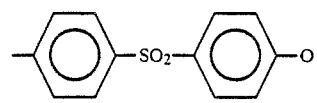

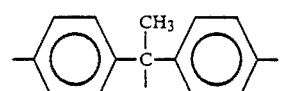

so that the phenoxyphenyl sulfone diamines include:

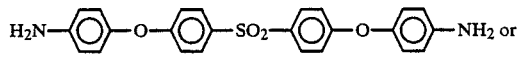

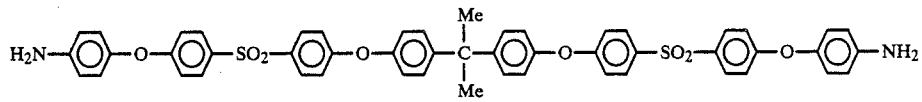

The molecular weights of these diamines varies from about 500 to about 2000. Using lower molecular weight diamines seems to enhance the mechanical properties of the difunctional polyamideimide oligomers, each of which has alternating ether 'sulfone' segments in the backbone.

Phenoxyphenyl sulfone diamines of this general nature can be prepared by reacting two moles of aminophenol with (n+1) moles of an aryl radical having terminal, reactive halo- functional groups (dihalogens), such as 4,4'-dichlorodiphenylsulfone, and a suitable bisphenol (i.e., dialcohol, dihydric phenol, or diol). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;
or mixtures thereof, as disclosed in U.S. Pat. No. 3,262,914. Bisphenols having aromatic character (i.e., absence of aliphatic segments), such as bisphenol-A, are preferred.

The dihalogens in this circumstance preferably are selected from the group consisting of:

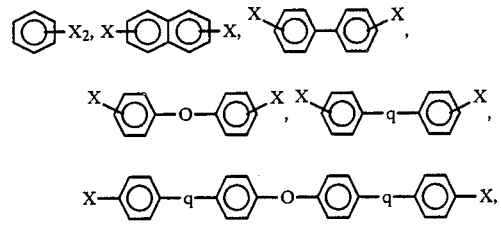

-continued

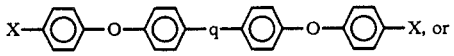

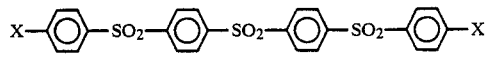

wherein
X=halogen, preferably chlorine; and
q=—S—, —SO$_2$—, —CO—, —(CH$_3$)$_2$C—, and —(CF$_3$)$_2$C—, and preferably either —SO$_2$— or —CO—.

The condensation reaction creates ether diamines that ordinarily include intermediate 'sulfone' linkages. The condensation generally occurs through a phenate mechanism in the presence of K$_2$CO$_3$ or another base in a DMSO/toluene solvent. The grain size of the K$_2$CO$_3$(s) should fall within the 100–250 ANSI mesh range.

Additional methods for preparing phenoxyphenysulfones of this general type are disclosed in U.S. Pat. Nos. 3,839,287 and 3,988,374.

The diacid halide or dicarboxylic acid (i.e. dibasic acid) may include an aromatic chain segment selected from the group consisting of:
(a) phenyl;
(b) naphthyl;
(c) biphenyl;
(d) a polyaryl 'sulfone' divalent radical of the general formula:

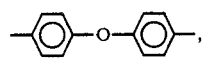

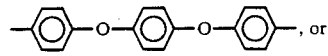

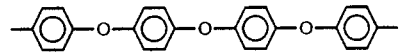

wherein D=—S—, —O—, —CO—, —SO$_2$—, —(CH$_3$)$_2$C—, —(CF$_3$)$_2$C—, or mixtures thereof throughout the chain; or
(e) a divalent radical having conductive linkages, illustrated by Schiff base compounds selected from the group consisting of:

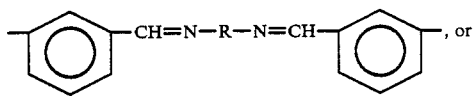

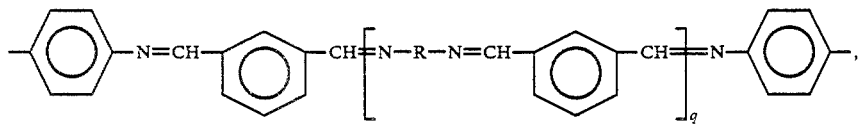

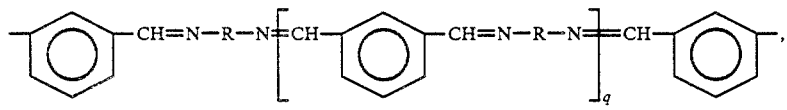

wherein R is selected from the group consisting of: phenyl; biphenyl; naphthyl; or a divalent radical of the general formula:

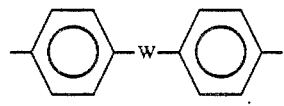

wherein W = —SO$_2$— or —CH$_2$—; and q = 0–4; or
(f) a divalent radical of the general formula:

wherein R$^1$ = a C$_2$ to C$_{12}$ divalent aliphatic alicyclic, or aromatic radical, and, preferably, phenyl (as described in U.S. Pat. No. 4,556,697).

Thiazole, oxazole, or imidazole linkages, especially between aryl groups, may also be used as the conductive linkages to form the conductive or semiconductive oligomers.

The preferred diacid halides include:

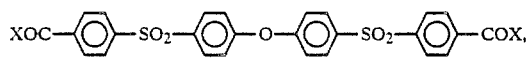

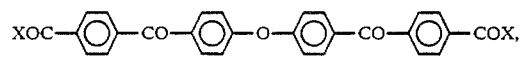

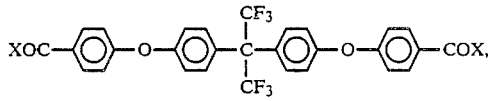

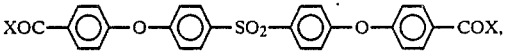

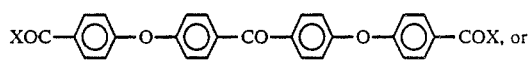

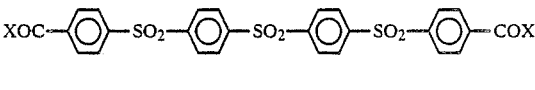

Schiff base dicarboxylic acids and diacid halides can be prepared by the condensation of aldehydes and aminobenzoic acid (or other amine acids) in the general reaction scheme:

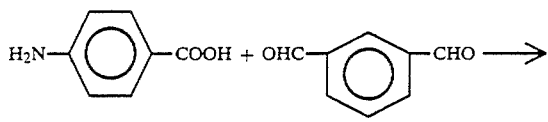

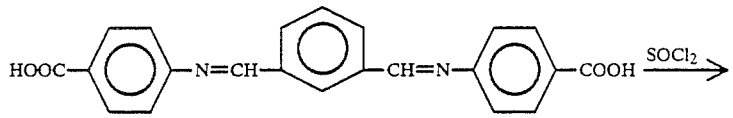

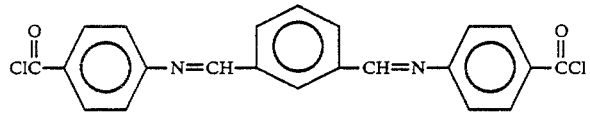

or similar syntheses.

Other diacid halides that can be used, but that are not preferred, are disclosed in U.S. Pat. No. 4,504,632, and include:
adipylchloride,
malonyl chloride,
succinyl chloride,
glutaryl chloride,
pimelic acid dichloride,
suberic acid dichloride,
azelaic acid dichloride,
sebacic acid dichloride,
dodecandioic acid dichloride,
phthaloyl chloride,
isophthaloyl chloride,
terephthaloyl chloride,
1,4-naphthalene dicarboxylic acid dichloride, and 4,4'-diphenylether dicarboxylic acid dichloride.

Polyaryl or aryl diacid halides are preferred to achieve the highest thermal stabilities in the resulting oligomers and composites insofar as aliphatic bonds are not as thermally stable as aromatic bonds. Particularly preferred compounds include intermediate electronegative (i.e., 'sulfone') linkages to improve toughness of the resulting oligomers.

The corresponding amideimide of the formula:

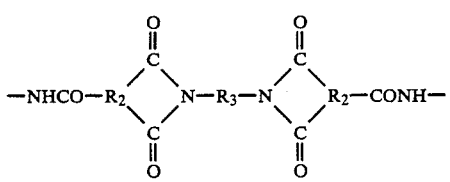

can be prepared if the acid anhydride:

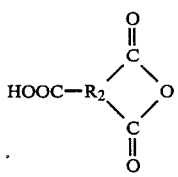

is used instead of the acid halide anhydride. The resulting intermediate products are dicarboxylic acids rather than dianhydrides. These dicarboxylic acids (or their diacid halides) can be used with the diamines previously described.

Dianhydrides useful for the synthesis of amideimides include:

(a) pyromellitic dianhydride,
(b) benzophenonetetracarboxylic dianhydride (BTDA), and
(c) 5-(2,5-diketotetrahydrofuryl)-3-methylcyclohexene-1,2-dicarboxylic anhydride (MCTC), but may be any aromatic or aliphatic dianhydride, such as those disclosed in U.S. Pat. Nos. 3,933,862; 4,504,632; 4,577,034; 4,197,397; 4,251,417; 4,251,418; or 4,251,420. Mixtures of dianhydrides might be used. Lower molecular weight dianhydrides are preferred, and MCTC or other aliphatic dianhydrides are the most preferred for the lower curing polyamideimides having caps with two crosslinking functionalities.

Of course, the dianhydrides also include those intermediates resulting from the condensation of the acid halide anhydride with any of the diamines previously described. Similarly, the dicarboxylic acids and diacid halides include those intermediates prepared by the condensation of the acid anhydride with any of the diamines previously described. The corresponding dicarboxylic acid is converted to the diacid halide (i.e. chloride) in the presence of $SOCl_2$.

The amideimides of the present invention can be synthesized by several schemes, as previously described. To obtain repeating units of the general formula:

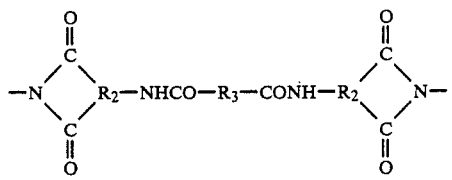

an acid halide anhydride particularly

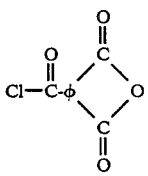

can be mixed with a diamine and with an amine end cap in the ratio of n: n: 2 wherein n=an integer greater than or equal to 1. In this reaction, the acid halide anhydride will react with the diamine to form an intermediate dianhydride which will condense with the diamine and amine end cap. The reaction may be carried out in two distinct stages under which the dianhydride is first prepared by mixing substantially stoichiometric amounts (or excess diamine) of the acid halide anhydride and diamine followed by the addition of a mixture of more diamine and the end cap. Of course, the diamine used to form the dianhydride may differ from that used in the second stage of the reaction, or it may be a mixture of diamines from the outset.

The related amideimide having repeating units of the general formula:

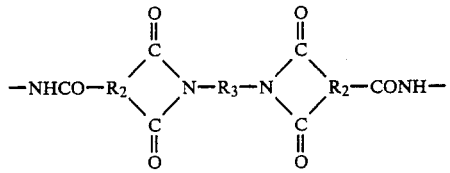

can be synthesized by reacting the acid anhydride with the diamine to form intermediate dicarboxylic acids, which can then react with more diamine or an amine end cap to complete the oligomer. Again, the reaction can be separated into steps.

The amideimide oligomers (as with all oligomers) appear to possess greater solvent resistance if the condensation of the dianhydride/dicarboxylic acid with the diamine and end cap is done similtaneously rather than sequentially.

While use of an amine end cap has been described above, corresponding oligomers can be formed by using an acid halide end cap, if the diamine is provided in excess. In this case the reaction mixture generally comprises the acid halide anhydride or the acid anhydride, the end cap, and the diamine and the synthesis is completed generally in one step.

All reactions should be conducted under an inert atmosphere and at elevated temperatures, if the reaction rate needs to be increased. The reaction mixture should be well stirred throughout the synthesis. Chilling the reaction mixture can slow the reaction rate and can assist in controlling the oligomeric product.

As suggested in U.S. Pat. No. 4,599,383, the diamine may be in the form of its derivative OCN—R—NCO, if desired.

The amideimides described in U.S. Pat. Nos. 4,599,383; 3,988,374; 4,628,079; 3,658,938; and 4,574,144 can all be capped with the crosslinking monomers to convert the polymers to oligomers that are suitable for forming advanced composite blends.

Polyetherimides and polysulfoneimides are capped to form oligomers that are suitable for use in the coreactive oligomer blends. Preferred compounds have the general formula:

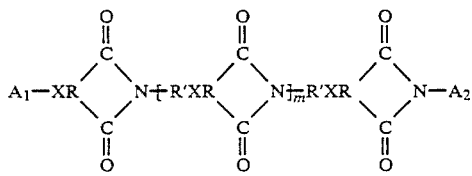

wherein
X = —O—;
$A_1 =$

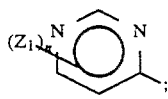

$n = 1$ or $2$;
$Z_1 = D$ or $Z$, as previously defined;
$R$ = a trivalent $C_{(6-13)}$ aromatic organic radical;
$R_1$ = any of lower alkyl, lower alkoxy, aryl, substituted alkyl, or substituted aryl (including hydroxyl or halo substituents);
$R_1$ = a divalent $C_{(6-30)}$ aromatic organic radical;
$A_2 =$

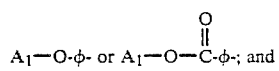

$\phi$ = phenyl.

The polyetherimide oligomers can be prepared by several reaction schemes. One such method comprises the simultaneous condensation of:

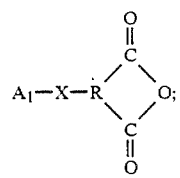 (I)

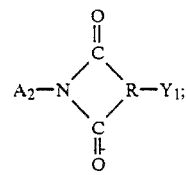 (II)

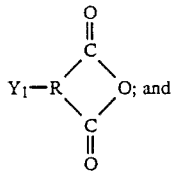 (III)

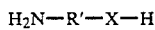

$H_2N-R'-X-H$ (IV)

in the ratio of I:II:III:IV = 1:1:m:m+1, wherein m is an integer greater than or equal to one. The product has the general formula previously described, wherein $Y_1$ = halo- or nitro-. The reaction occurs in a suitable solvent under an inert atmosphere. If necessary, the reaction mixture can be heated to facilitate the reaction. The reaction conditions are generally comparable to those described in U.S. Pat. Nos. 3,847,869 and 4,107,147.

Compounds of formula (I) can be prepared by condensing the hydroxyl-substituted pyrimidine end cap monomers with nitrophthalic anhydride. Compounds of formula (II) can be prepared by condensing the hydroxyl-substituted pyrimidine end cap monomers with aminobenzoic acid halide or nitroaniline or by condensing the halo-substituted pyrimidine end cap with aminophenol, each case followed by condensation of the resulting amine with nitro- or halophthalic anhydride.

Alternatively, the polyetherimides can be prepared by reacting a polyetherimide polymer made by the self-condensation of a phthalimide salt of the formula:

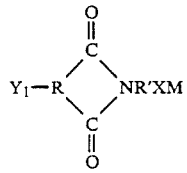

with crosslinking end cap moieties of the formulae:

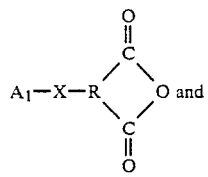

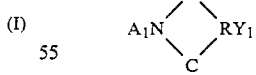

wherein
X, $A_1$, $A_2$, R, and $Y_1$ are as previously defined,
$R'$ = a divalent $C_{(6-30)}$ aromatic organic radical, and
M = an alkali metal ion or ammonium salt or hydrogen.

The self-condensation proceeds as described in U.S. Pat. No. 4,297,474 in a dipolar aprotic solvent. The end cap moieties can be introduced during the self-condensation to quench the polymerization, or they might be added following completion of the polymerization and recovery of the polyetherimide polymer from methanol. Improved solvent resistance on the cured composites is best achieved, however, by the quenching sequence rather than by the capping sequence which follows polymerization.

Yet another preferred method for synthesizing the polyetherimides of the present invention involves the simultaneous condensation of about 2m+2 moles of nitrophthalic anhydride with about m+1 moles of diamine, about m moles of dialcohol (i.e., bisphenol, diol, or dihydric phenol), and 2 moles of $A_1$—OH in a suitable solvent under an inert atmosphere. Here, the dialcohol may actually be in the form of a phenate.

In this reaction, the diamines (which preferably have aromatic ethersulfone backbones) react with the anhydride to form intermediates of the following nature in the backbone:

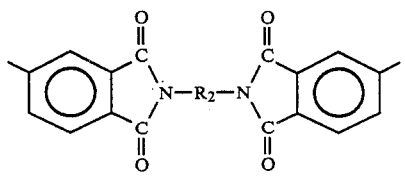

wherein $R_2$=a residue of the diamine. Similarly, the dialcohol reacts with the nitro-functionality to form an ether linkage of the general formula:

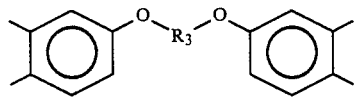

wherein $R_3$=a residue of the dialcohol. The $A_1$—OH end caps quench the Polymerization. The resulting polyetherimides have the general formula:

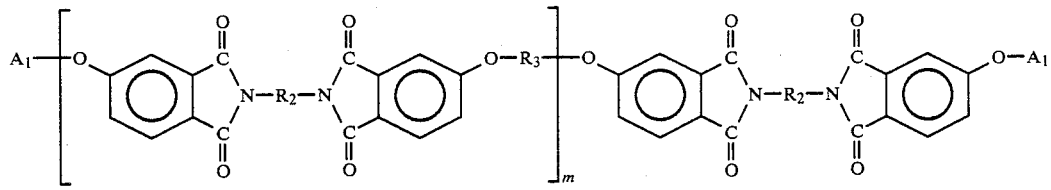

Another preferred synthesis comprises the simultaneous condensation of about 2m+2 moles of nitrophthalic anhydride with about m+1 moles of dialcohol, m moles of diamine, and 2 moles $A_2$—$NH_2$ in a suitable solvent under an inert atmosphere. Again, the dialcohol may be in the phenate form. The resulting oligomer has a general formula:

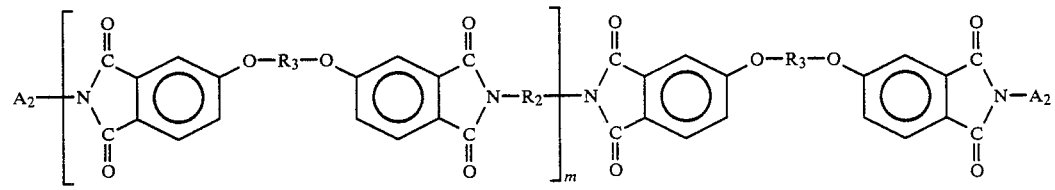

In any of the syntheses, the dialcohol can be replaced by a comparable disulfhydryl of the formula: HS—R-$_2$—SH. Mixtures of dialcohols, or disulfhydryls, or dialcohols and disulfhydryls can be used.

Although the bisphenols previously described can be used, for etherimides, the dialcohol is generally a polyaryl compound and preferably is selected from the group consisting of:

HO—Ar—OH;

HO—Ar—L—Ar'—L—Ar—OH;

HO—Ar'—L—Ar—L—Ar'—OH;

wherein
L=—$CH_2$—, $(CH_3)_2C$—, —$(CF_3)_2C$—, —O—, —S—, —$SO_2$— or —CO—;
Ar'=

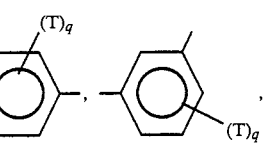

Ar=

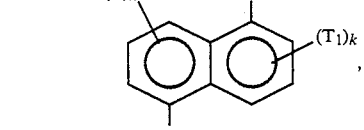

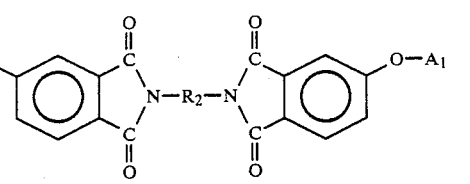

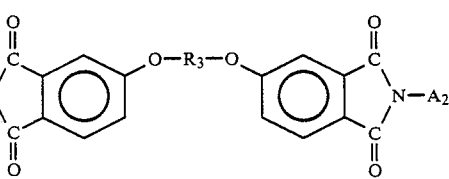

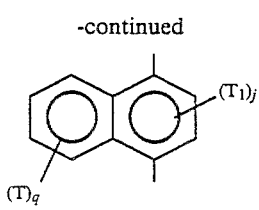

q=0-4;
k=0-3; and
j=0, 1, or 2.

The dialcohols also include hydroquinone; bisphenol-A; p,p'-biphenol; 4,4'-dihydroxydiphenylsulfide; 4,4'-dihydroxydiphenylether; 4,4'-dihydroxydiphenylisopropane; 4,4'-dihydroxydiphenylhexafluoropropane; a dialcohol having a Schiff base segment, the radical being selected from the group consisting of:

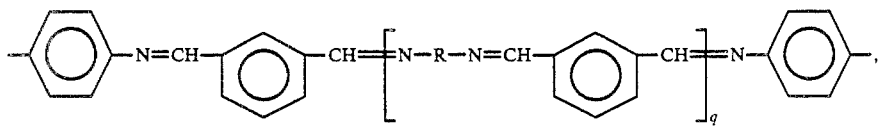

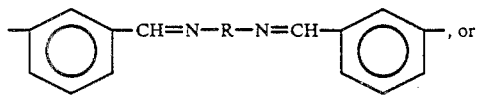

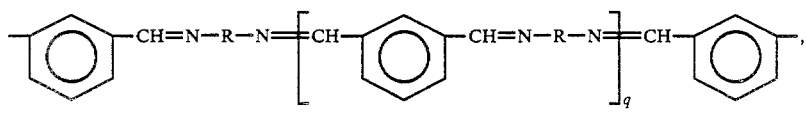

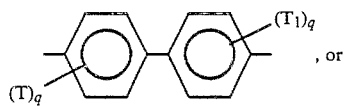

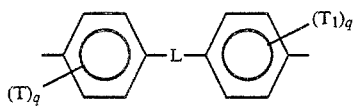

T and T₁=lower alkyl, lower alkoxy, aryl, aryloxy, substituted alkyl, substituted aryl, halogen, or mixtures thereof;

wherein R is selected from the group consisting of:
phenyl;
biphenyl;
naphthyl; or
a radical of the general formula:

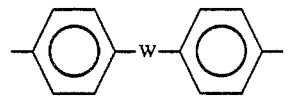

wherein W=—CH₂— or —SO₂—; or
a dialcohol selected from the group:

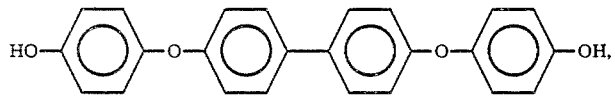

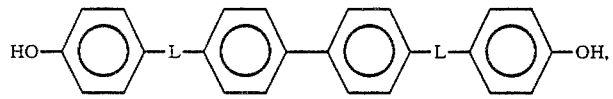

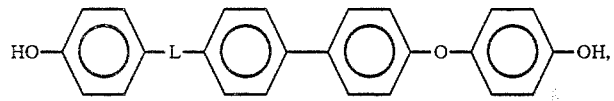

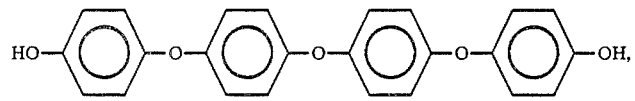

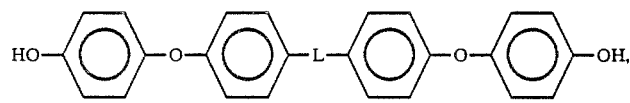

-continued

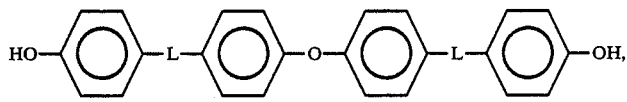

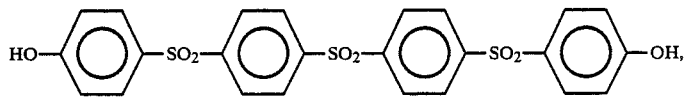

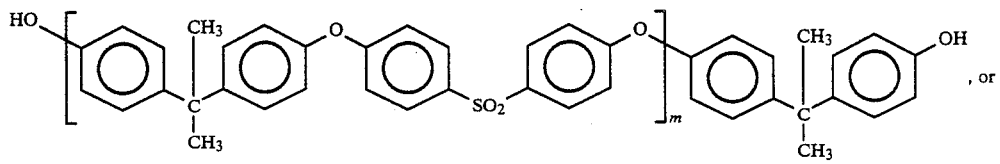

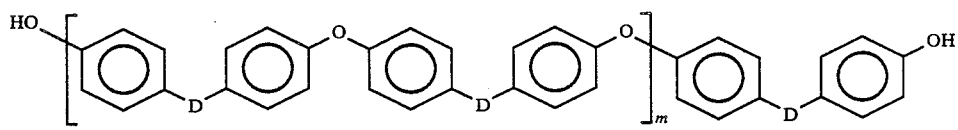

wherein
L is as previously defined;
Me=methyl;
m=an integer, generally less than 5, and preferably 0 or 1; and
D=any of —CO—, —SO$_2$—, or —(CF$_3$)$_2$C—.

While bisphenol-A is preferred in the etherimide synthesis (because of cost and availability), the other dialcohols can be used to add rigidity to the oligomer without significantly increasing the average formula weight, and, therefore, can increase the solvent resistance. Random or block copolymers are possible.

Furthermore, the dialcohols may also be selected from the those described in U.S. Pat. Nos. 4,584,364; 3,262,914; or 4,611,048. The hydroxy-terminated etherimides of U.S Pat. No. 4,611,048 can be reacted with A$_2$—NO$_2$ to provide crosslinking etherimides of the present invention. Compounds of the formula A$_2$-NO$_2$ can be prepared by reacting the halo-substituted pyrimidine end cap monomers with nitrophenol.

Dialcohols of this nature are commercially available. Some may be easily synthesized by reacting halide intermediates with bis-phenates, such as by the reaction of 4,4'-dichlorodiphenylsulfone with bis(disodium biphenolate).

The oligomers can be synthesized in a homogeneous reaction scheme wherein all the reactants are mixed at one time (and this scheme is preferred), or in a stepwise reaction. The diamine and dialcohols can be mixed, for example, followed by addition of the nitrophtalic anhydride to initiate the polymerization and thereafter the end caps to quench it. Those skilled in the art will recognize the different methods that might be used. To the extent possible, undesirable competitive reactions should be minimized by controlling the reaction steps (i.e., addition of reactants) and the reaction conditions.

Suitable diamines include those diamines described with reference to the amideimide synthesis.

Polysulfoneimide oligomers corresponding to the etherimides can be prepared by reacting about m+1 moles of a dianhydride with about m moles of a diamine and about 2 moles of an amine end cap (A$_2$—NH$_2$) The resulting oligomer has the general formula:

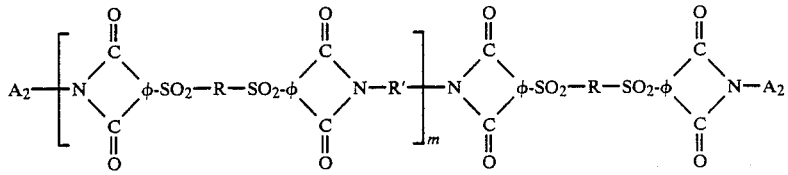

wherein R and R' are divalent aromatic organic radicals having from 2-20 carbon atoms. R and R' may include halogenated aromatic C$_{(6-20)}$ hydrocarbon derivatives; alkylene radicals and cycloalkylene radicals having from 2-20 carbon atoms; C$_{(2-8)}$ alkylene terminated polydiorganosiloxanes; and radicals of the formula:

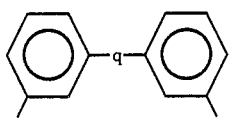

wherein
q=—C$_y$H$_{2y}$—, —CO—, —SO$_2$—, —O—, or —S—; and
y=1 to 5.

Comparable polymers, usable in blends of the sulfoneimides, are described in U.S. Pat. No. 4,107,147. Aromatic dithiodianhydrides are described in U.S. Pat. No. 3,933,862.

Heterocycle or heterocycle sulfone oligomers can be prepared by the condensation of:
(a) 2 moles of a hydroxyl end-cap monomer;
(b) n moles of a four-functional compound, and (c) (n+1) moles of a suitable dicarboxylic acid halide, or by the condensation or:
(a) 2 moles of an acid halide end-cap monomer;
(b) (n+1) moles of a four-functional compound; and
(c) n moles of a dicarboxylic acid halide.

Suitable diacid halides include those compounds described with the reference to the amideimide systheses.

The four-functional compound has the general formula:

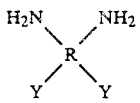

wherein R is an hydrocarbon radical (preferably, an aromatic radical, if the highest thermal stability is sought); Y=—OH, —NH₂, or —SH; and the amine functionalities (—NH₂) are not substituted on the same carbon atom as the Y substituents. The four-functional compound generally is selected from the group consisting of: dihydoxybenzidine, dimercaptobenzidine, dihydroxydiaminobenzene, dimercaptodiaminobenzene, diaminobenzidine, or a compound having the general formula:

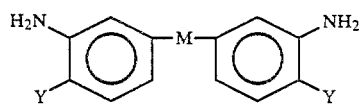

wherein

M=—CO—, —SO₂—, —(CF₃)₂C—, —S—, or —O—; and
Y=—OH, —SH, or —NH₂.

Isomers of the four-functional compound may also be used so long as the isomers include two pairs of an amine and a 'Y' functionality on adjacent carbons on an aromatic radical. The resulting oligomers include oxazole, thiazole, or imidazole linkages.

Polyimide oligomers can be prepared using 2 moles of an amine end cap (e.g., A₂—NH₂) with n moles of diamine and (n+1) moles of dianhydride.

Preferred diamines for the polyimide condensation include ethersulfone diamines of the general formula:

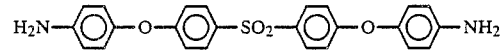

wherein R and R' are aromatic radicals, at least one of R and R' being a diaryl radical wherein the aryl rings are joined by a 'sulfone' (i.e. electronegative) linkage, and q is an integer from 0 to 27 inclusive. Preferably R is selected from the group consisting of:

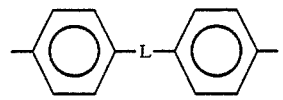

wherein L=—SO₂—, —(CF₃)₂C—, or —S—. R' is preferably selected from the group consisting of:

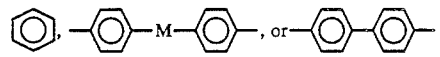

wherein M=—SO₂—, —S—, —O—, —(CH₃)₂C—, or —(CF₃)₂C—.

Preferred diamines are those in which R is

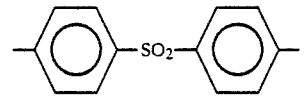

and R" is

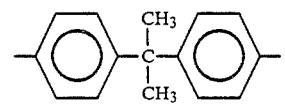

Accordingly, the diamines generally contain at least one phenoxyphenylsulfone group, such as:

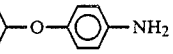

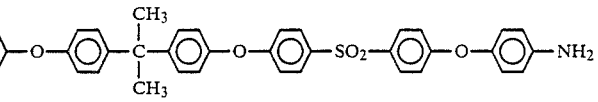

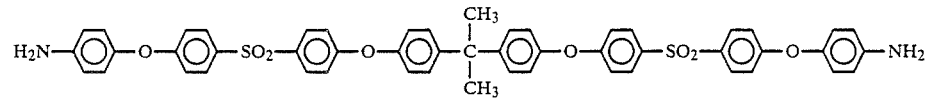

These diamines have alternating ether and "sulfone" linkages, wherein "sulfone" designates an electronegative linkage (—M—) as previously defined.

The dianhydride may be is 5-(2,5-diketotetrahydrofuryl)-3-methyl-3-cyclohexene-1,2-dicarboxylic anhydride (MCTC), an unsaturated, aliphatic dianhydride.

The diamines and dianhydrides react to form repeating imide linkages along the generally linear backbone of the oligomers. Preferred properties in the oligomer are obtained when the backbone is periodically disrupted by the inclusion of an aliphatic moiety, especially an MCTC residue.

Diamines which include phenoxyphenylsulfone moieties are preferred, since these diamines provide the blend of physical properties in the oligomers which are desired. Impact resistance and toughness is afforded with the electronegative "sulfone" linkages which act as joints or swivels between the aryl groups. The aliphatic residues, such as those from MCTC, provide lower melt temperatures, and allow the use of lower temperature end caps, such as oxynadic and dimethyl oxynadic (DONA) end caps. The resulting oligomers cure at lower temperatures than other solvent-resistant oligomers, have the desirable features of polyimides, and have better solvent-resistance than conventional polyimides, such as those described in U.S. Pat. Nos. 3,998,786 or 3,897,395 (D'Alelio).

These polyimide oligomers may be used to form prepregs by the conventional method of impregnating a suitable fabric with a mixture of the oligomer and a solvent. Suitable coreactants, such as p-phenylenediamine, benzidine, and 4,4'-methylenedianiline, may be added to the solvent when preparing prepregs.

The most preferred linear polyimides are prepared with dianhydrides selected from para- and meta- dianhydrides of the general formula:

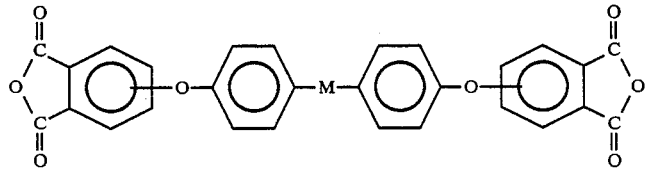

wherein $M = -SO_2-$ or $-CO-$, reacted with

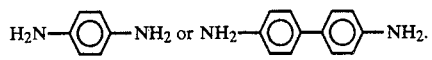

Solvent resistant, thermoplastic aromatic poly(imidesulfone) oligomers are also described in U.S. Pat. Nos. 4,398,021 and 4,489,027. Melt-fusible polyimides made by the condensation of dianhydrides and diamines are described in U.S. Pat. No. 4,485,140.

Polyamides are prepared by condensing dicarboxylic acid halides with diamines and acid halide or amine end caps. There polyamides are generally formed from the diacid halides and diamines that have previously been described.

Polyesters or polyestersulfones are prepared by condensing the diacid halides and dialcohols (i.e., bisphenols, dihydric phenols, or diols) previously described. Polyethers or ethersulfones are prepared by condensing dinitro compounds or dihalogens and dialcohols or by other conventional syntheses wherein suitable end-cap monomers are added to quench the synthesis and to provide one or more coreactive functionalities at each end of the oligomers.

The dihalogen is generally a compound selected from those described previously with respect to the synthesis of diamines. Dinitro compounds are generally prepared by reacting nitrophthalic anhydride with the diamines. Of course, dihalogens can be prepared in the same way by replacing the nitrophthalic anhydride with halophthalic anhydride Nitroaniline, nitrobenzoic acid, or nitrophenol may also be condensed with dianhydrides dicarboxylic acid halides, diamines, dialcohols, or dihalogens to prepare other dinitro compounds that include amide, imide, ether, or ester linkages between the terminal phenyl radicals and the precursor backbones. The synthesis of the dinitro compounds or dihalogens can occur prior to mixing the other reactants with these compounds or the steps can be combined in suitable circumstances to directly react all the precursors into the oligomers. For example, a polyether oligomer can be prepared by simultaneously condensing a mixture of a hydroxyl end cap monomer, nitrophthalic anhydride, phenylene diamine, and HO—$\phi$—O$\phi$—O$\phi$—O—$\phi$—OH, wherein $\phi$=phenyl.

While other common resin backbones may be capped in a corresponding manner and used in advanced composite blends of the present invention, the linear backbones described above are the most directly suited for aerospace applications. Although the concept of advanced composite blends is probably best suited to linear morphology, however, the advanced composite blends of the present invention also include multidimensional oligomers and polymers. Linear morphology is preferred because the resulting composites have mixtures of polymers of relatively large and roughly equivalent average formula weight. The individual polymers are similar in structure. We have found it difficult in many circumstances to process multidimensional oligomers that have appreciable average formula weights, so the properties of composites made from multidimensional advanced composite blends might suffer because of diversity of formula weights. Furthermore, the addition polymerization reaction for multidimensional oligomers results in formation of a complex, 3-dimensional network of crosslinked oligomers that is difficult or impossible to match with the multidimensional polymers, because these polymers simply have extended chains or short chains. That is, upon curing, the multidimensional oligomers crosslink to chemically interconnect the arms or chains through the end caps, thereby forming a network of interconnected hubs with intermediate connecting chains. The connecting chains have moderate formula weight. Although the cured oligomer can have appreciable formula weight. In contrast, the polymer (which does not crosslink) simply has a hub with arms of moderate formula weight. While for linear morphology the disadvantages of blended composites that have a wide diversity of average formula weight polymers as constituents can be overcome by curing relatively low formula weight oligomers into relatively high average formula weight cured polymers that are roughly equivalent to the polymer constituents, the polymers in the multidimensional morphology are likely to have average formula weights lower than the oligomeric component. Therefore, we believe that the best results for the present invention may be achieved with systems having linear morphology.

Although we have yet to verify our theory experimentally, it may be possible and desirable to synthesize the polymeric component of the multidimensional advanced composite blend when curing the oligomer, and, in the way, forming relatively comparable oligomeric and polymeric networks. To achieve this effect, we would mix, for example, a multidimensional oligomer with comparable polymeric precursors, such as triamines and tricarboxylic (i.e. tribasic) acid halides. Upon curing, the precursors would condense to form amide linkages to form bridges between hubs in a manner comparable to the oligomeric connecting chains.

A multidimensional oligomer includes an aromatic hub and three or more radiating chains or arms, each chain terminating with a crosslinking end cap segment. Each chain includes the resin linkages previously described. Each chain is substantially the same. For example, a multidimensional ether can be prepared by the simultaneous condensation of phloroglucinol with a dihalogen and an imidophenol end cap monomer.

In multidimensional oligomers the higher density of crosslinking functionalities in a multidimensional array provides increased thermo-oxidative stability to the cured composites. Usually the hub will have three radiating chains to form a "Y" pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, azaline (e.g., melamine), or other aromatic moieties may also be used as the hub radical.

Details of the several preferred multidimensional oligomers will now be described in a manner similar to that used for the linear oligomers.

Multidimensional polyamideimide oligomers include oligomers of the general formula:

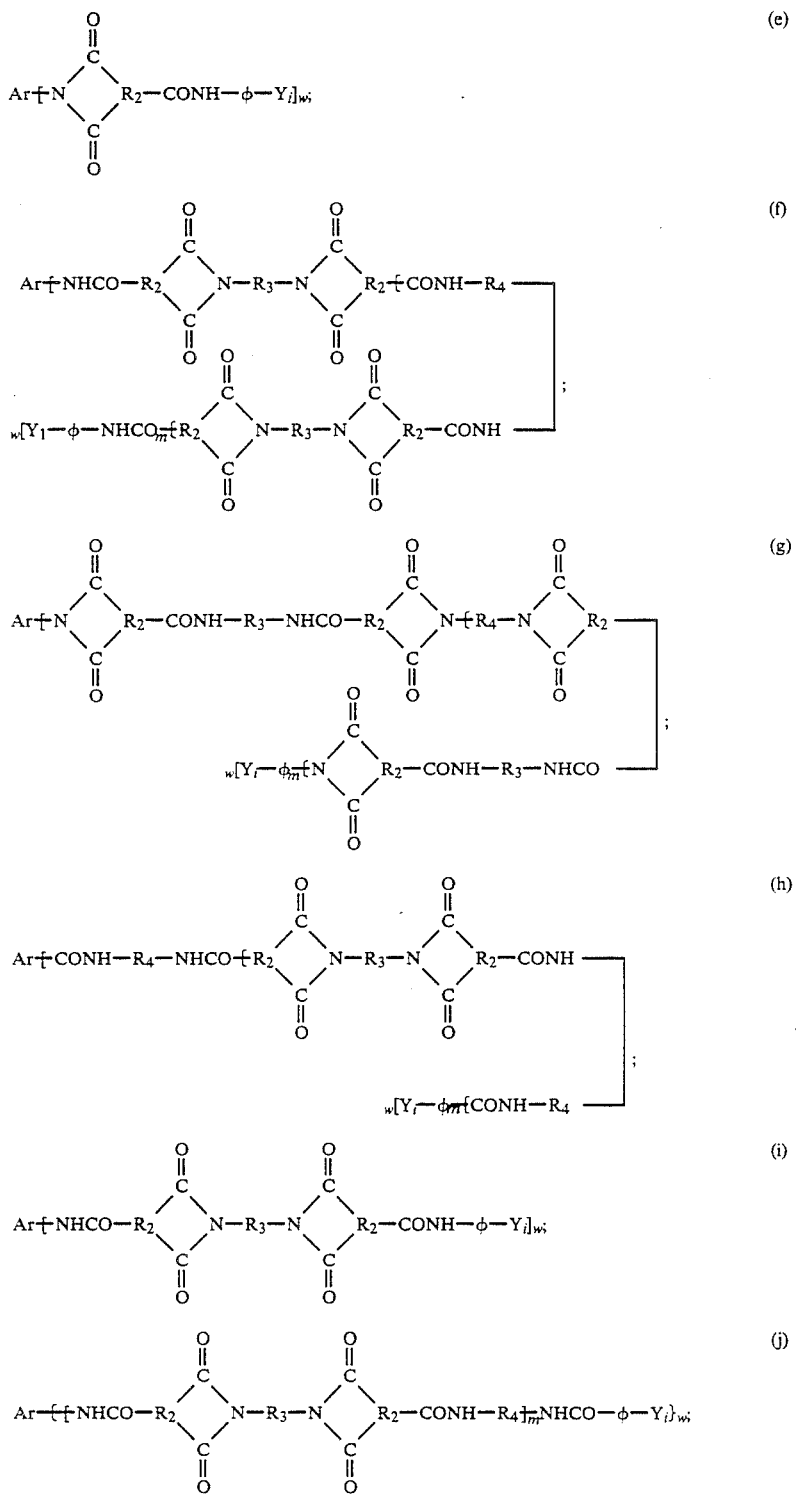

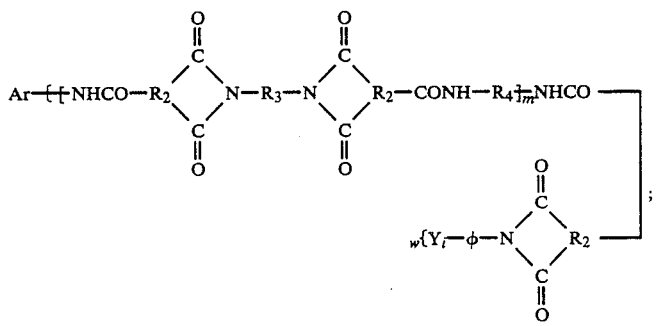
(k)
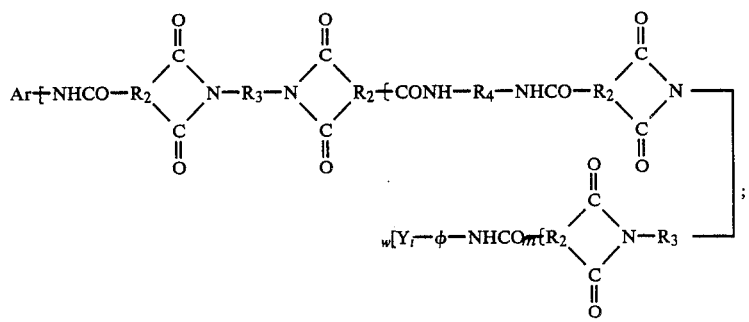
(l)
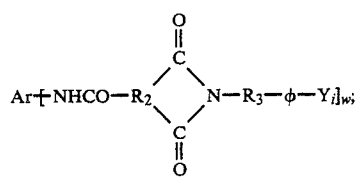
(m)
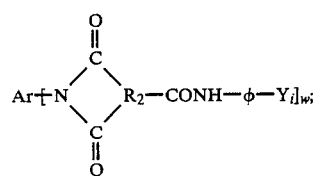
(n)
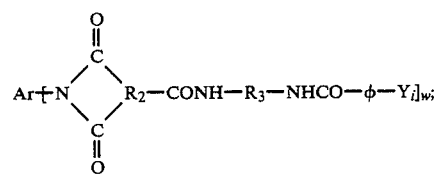
(o)
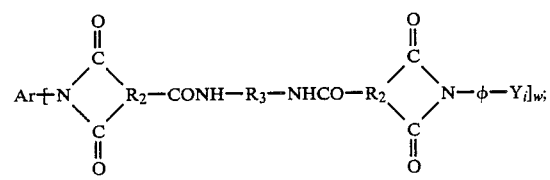
(p)
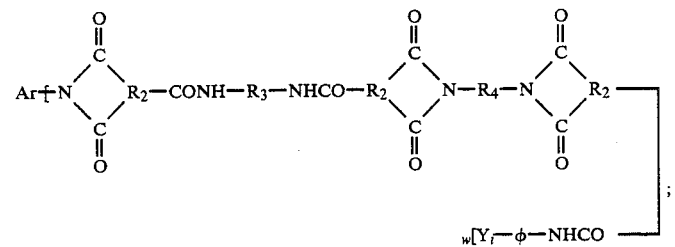
(q)

-continued

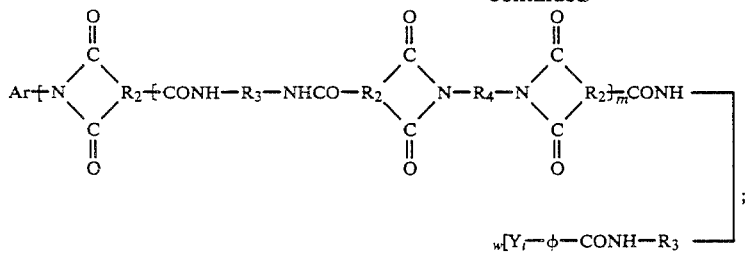  (r)

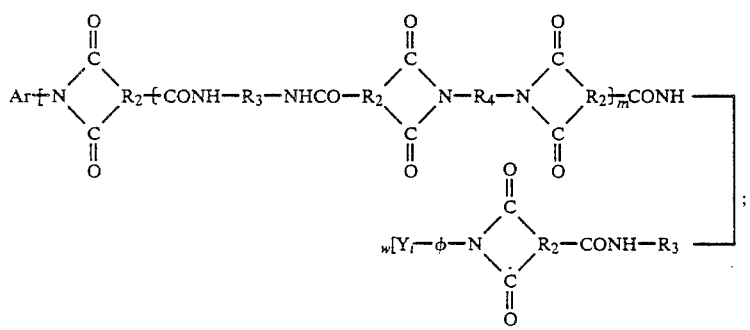  (s)

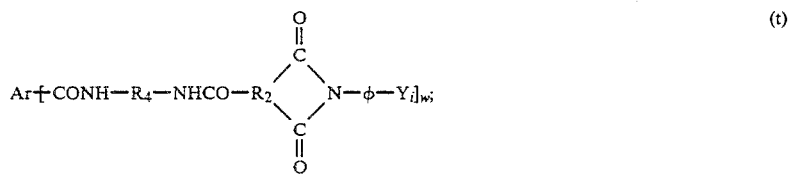  (t)

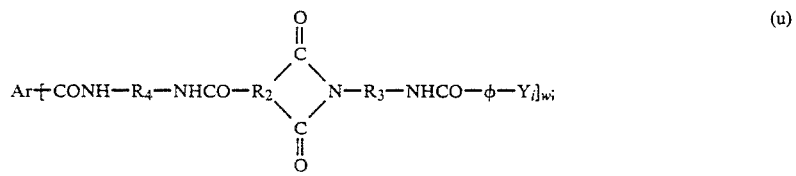  (u)

or

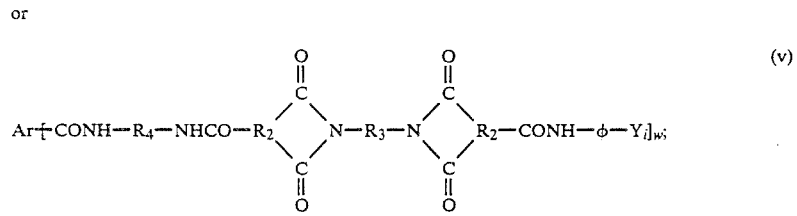  (v)

wherein Y, $R_2$, $R_3$, $R_4$, and m are as previously defined with respect to the linear amideimides, Ar = an organic radical of valency w; $\phi$=phenyl, and w=3 or 4. Preferably, Ar is an aromatic radical (generally phenyl) generally selected from phenyl, naphthyl, biphenyl, azalinyl (such as melamine), or triazine derivatives of the general formula:

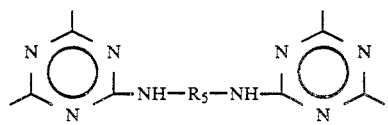

wherein $R_5$=a divalent hydrocarbon residue containing 1-12 carbon atoms, as described in U.S. Pat. No. 4,574,154.

The hub may also be a residue of an etheranhydride of the formula:

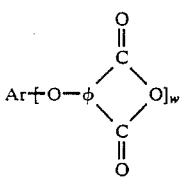

or an etheramine of the formula:

Ar$\{$-O—$\phi$—NH$_2]_w$

The best results are likely to occur when the arm length of the oligomers is as short as possible (to allow ease of processing) and the oligomer has six crosslinking sites (to allow the highest density of crosslinking). The most preferred hub includes the phenyl radical, since these compounds are relatively inexpensive, are more readily obtained, and provide oligomers with high thermal stability.

The chains of the oligomers include crosslinking end caps which improve the solvent-resistance of the cured composites. These end caps may be thermally or chemically activated during the curing step to provide a strongly crosslinked, complex, multidimensional array of interconnected oligomers.

The multidimensional oligomers may be formed by the attachment of arms to the hub followed by chain extension and chain termination. For example, trihydroxybenzene may be mixed with p-aminophenol and 4,4'-dibromodiphenylsulfone and reacted under an inert atmosphere at an elevated temperature to achieve an amino-terminated "star" of the general formula:

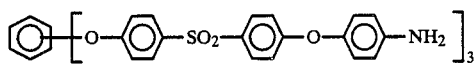

that can be reacted with suitable diacid halides, diamines, and end caps to yield a polyamideimide oligomer.

The etheranhydride hub can be synthesized by reacting nitrophthalic anhydride or halophthalic anhydride with Ar$\leftarrow$OH)$_W$ in a suitable solvent under an inert atmosphere, as described generally in our copending application, U.S.S.N. 016,703 and in U.S. Pat. No. 3,933,862 (thio-analogs).

The oligomers, of course, might be made by reacting nitrophthalic anhydride with an amine end cap followed by the condensation with the hydroxy hub or in similar reaction schemes that will be understood by those of ordinary skill.

The simplest multimdimensional pyrimidine-based oligomers can be prepared by reacting the halo-substituted end cap with phloroglucinol, the hydroxyl-substituted end cap monomer with trichlorobenzene, or the hydroxyl-substituted end cap monomer with cyuranic acid chloride.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

Linear or multidimensional oligomers can be synthesized from a mixture of four or more reactants so that extended chains may be formed. Adding components, however, adds to the complexity of the reaction and of its control. Undesirable competitive reactions may result or complex mixtures of macromolecules having widely different properties may be formed, because the chain extenders and chain terminators are mixed, and compete with one another.

Multidimensional etherimides can be made by reacting the etheranhydride hub with compounds of the formulae II, III, and IV previously described.

Multidimensional amides are prepared by condensing a nitro, amine, or acid halide hub with suitable diamines, dicarboxylic acid halides, and amine or acid halide end cap monomers to form oligomers of the general formulae:

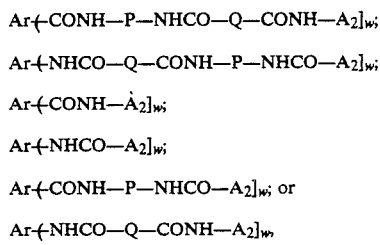

wherein Ar, w, and A$_2$ are as previously defined, P=a residue of a diamine, and Q=a residue a dicarboxylic acid halide.

Multidimensional imides can be made using the amine, etheranhydride, or etheramine hubs with suitable diamines, dianhydrides, and amine or anhydride end caps, as will be understood by those of ordinary skill.

Multidimensional polyesters can be made using hydroxy or carboxylic acid hubs (particularly cyuranic acid) with suitable diols and diacid halides. Carboxylic acid hubs include those compounds described in U.S. Pat. No. 4,617,390 and compounds prepared by reacting polyols, such as phloroglucinol, with nitrobenzoic acid or nitrophthalic acid to form ether linkages and active, terminal carboxylic acid funtionalities. The nitrobenzoic acid products would have three active sites while the nitrophthalic acid products would have six; each having the respective formula:

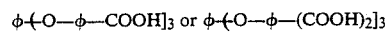

wherein $\phi$=phenyl. Of course other nitro/acids can be used.

Hubs can also be formed by reacting the corresponding halo-hub (such a tribromobenzene) with aminophenol to form triamine compounds represented by the formula:

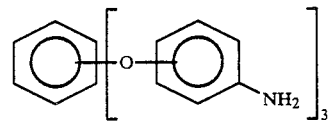

which can then be reacted with an acid anhydride to form a polycarboxylic acid of the formula:

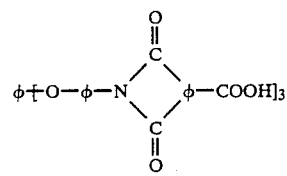

wherein $\phi$=phenyl; the hub being characterized by an intermediate ether and imide linkage connecting aromatic groups. Thio-analogs are also contemplated, in accordance with U.S. Pat. No. 3,933,862.

The hub may also be a polyol such as those described in U.S. Pat. No. 4,709,008 to tris(hydroxyphenyl)alkanes of the general formula:

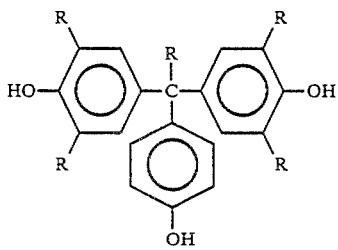

wherein R=hydrogen or methyl and can be the same or different. The polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469).

The polyols may also be reacted with nitrophthalic anhydride, nitroaniline, nitrophenol, or nitrobenzoic acids to form other compounds suitable as hubs as will be understood by those of ordinary skill.

Phenoxyphenyl sulfone arms radiating from a hub with a terminal amine, carboxylic acid, or hydroxyl group are also precursors for making multidimensional polyester oligomers of the present invention.

The best results are likely to occur when the hub is phloroglucinol or cyuranic acid. In either case a suitable end-cap monomer (hydroxyl, halo, or acid halide) can be reacted with the hub to form "short-armed," multidimensional oligomers having three or six crosslinking sites. These compounds are the simplest multidimensional oligomers and are relatively inexpensive to synthesize.

Multidimensional amides, amide imides, heterocycles, and heterocycle sulfones can be prepared using these carboxylic acid hubs, as will be understood by those of ordinary skill in the art.

Multidimensional oligomers of the formula:

$$Ar\text{-}[O\text{-}\phi\text{-}CO\text{-}A_2]_w$$

can also be synthesized with an Ullmann aromatic ether synthesis followed by a Friedel-Crafts reaction, as will be further explained.

Here, Q=

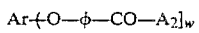

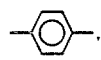

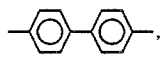

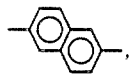

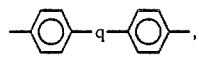

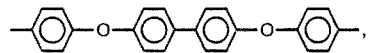

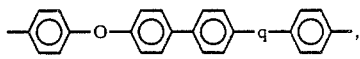

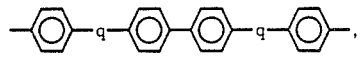

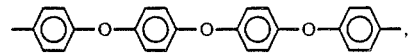

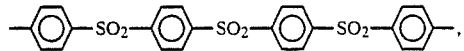

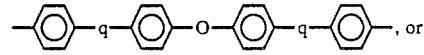

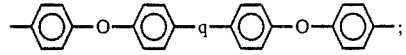

$q=-SO_2-$, $-CO-$, $-S-$, or $-(CF_3)_2C-$, and preferably $-SO_2-$, or $-CO-$; and $A_2$=a crosslinking end cap as previously defined.

To form the $Ar\text{-}[O\text{-}\phi\text{-}CO\text{-}A_2]_w$ oligomers, preferably a halo-substituted hub is reacted with phenol in DMAC with a base (NaOH) over a Cu Ullmann catalyst to produce an ether "star" with active hydrogens para- to the ether linkages. End caps terminated with acid halide functionalities can react with these active aryl groups in a Friedel-Crafts reaction to yield the desired product. For example, 1 mole of trichlorobenzene can be reacted with about 3 moles of phenol in the Uhlman ether reaction to yield an intermediate of the general formula:

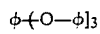

This intermediate can, then, be reacted with about 3 moles of

to produce the final, crosslinkable, ether/carbonyl oligomer.

The end caps crosslink at different temperatures (i.e. they apparently decompose in a reverse Diels-Alder at different curing temperatures), so the cap should be selected to provide cured composites of the desired thermal stability. That is, the backbone of the oligomer should be stable to at least the cure temperature of the caps. The multidimensional morphology allows the oligomers to be cured at a temperature far below the use temperature of the resulting composite, so completely aromatic backbones connected by heteroatoms are preferred to enhance the thermal stability.

Blends can improve impact resistance of pure oligomer composites without causing a significant loss of solvent resistance. The advanced composite (i.e. mixed chemical) blends of the present invention comprise mixtures of one or more crosslinkable oligomer and one or more polymer from a different chemical family. The polymers are incapable of crosslinking. The crosslinkable oligomer and the compatible polymer can be blended together by mixing mutually soluble solutions of each. While the blend is often equimolar in the oligomer and polymer, the ratio of the oligomer and polymer can be adjusted to achieve the desired physical properties. The properties of the composite formed from the advanced composite blend can be adjusted by altering the ratio of formula weights for the polymer and oligomer.

In synthesizing the polymers, quenching compounds can be employed, if desired, to regulate the polymerization of the comparable polymer, so that, especially for linear systems, the polymer has an average formula weight initially substantially greater than the crosslinkable oligomer. For thermal stability, an aromatic quenching compound, such as aniline, phenol, or benzoic acid chloride is preferred. The noncrosslinking polymer can be made by the same synthetic method as the oligomer with the substitution of a quenching cap for the crosslinking end cap.

While the best advanced composite blends are probably those of modest formula weight and those in which the oligomer and polymer are in equimolar proportions, other compositions may be prepared, as will be recognized by those of ordinary skill in the art.

Solvent resistance of the cured composite may decrease markedly if the polymer is provided in large excess to the oligomer in the blend.

The advanced composite blends may, in the case of the coreactive blends or in other cases, include multiple oligomers or multiple polymers, such as a mixture of an amideimide oligomer, an amide oligomer, and an imide polymer or a mixture of an amideimide oligomer, an amideimide polymer, and an imide polymer (i.e. blended amideimide further blended with imide). When polyimide oligomers are used, the advanced composite blend can include a coreactant, such as p-phenylenediamine, benzidine, or 4,4'-methylenedianiline. Ethersulfone oligomers can include these imide coreactants or anhydride or anhydride-derivative coreactants, as described in U.S. Pat. Nos. 4,476,184 or 4,414,269. Other combinations of oligomers, polymers, and coreactants will be recognized by those of ordinary skill in the art.

As discussed above, the oligomeric component of the advanced composite blend may itself be a blend of the oligomer and a compatible polymer from the same chemical family, further blended with the compatible polymer from the different family. The advanced composite blends, also, can simply be made from three or more oligomeric or polymeric components. They generally include only one oligomeric component unless coreactive oligomers are used.

Curing may yield semi-interpenetrating networks of the general type described by Egli et al., "Semi-Interpenetrating Networks of LARC-TPI" available from NASA-Langley Research Center.

The coreactive oligomer blends are prepared by mixing mutually soluble mixtures of the two resins, in a method analogous to making oligomer-polymer blends.

As suggested at the outset of the discussion of multidimensional morphology, formula weight matching in the cured composite poses a problem. We have found it difficult to process high average formula weight multidimensional oligomers, so we suspect that it will be difficult to prepare an advanced composite blend that includes a polymer of relatively high average formula weight. To overcome this potential problem, we theorize that it may be possible to prepare a blend that includes the oligomer and polymeric precursors. For example, a polyether oligomer of the general formula:

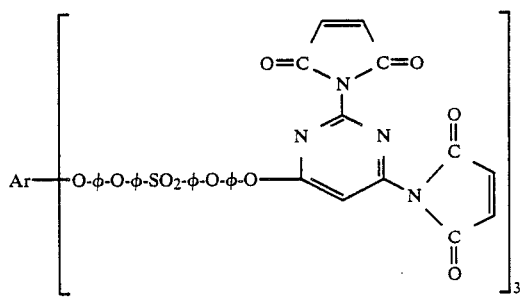

might be mixed with polyamide polymeric precursors of the general formulae:

Ar(—CONH—φ—SO$_2$—φ—O—φ—NH$_2$]$_3$ and

Ar(—NHCO—Q—COOH]$_3$ wherein Ar=an aromatic hub, φ=phenyl, and Q=a residue of a dicarboxylic acid, so that, upon curing, the oligomer crosslinks and the polymeric precursors condense through the amine and acid to form a polyamide polymer. This approach may be best suited for the lower curing oligomers. The product may include addition polymers and block copolymers of the oligomer and one or both of the polymeric precursors.

Generally the coreactive oligomer blends are selected to tailor the physical properties of the resulting block copolymer composites. For example, stiffening can be achieved for a composite made from an ethersulfone oligomer by adding a benzoxazole oligomer as a coreactant. Those skilled in the art will recognize the benefits to be gained through coreactive oligomer blends. The relatively stiff and rigid heterocycle oligomers can be toughened in this way.

Dopants for creating semiconductive or conductive composites with "Schiff base" oligomers are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the oligomers or polymers to form charge transfer complexes. N-type semiconductors result from doping with alkali metal dispersions. P-type semiconductors result from doping with elemental iodine or perchlorates. Dopant should be added to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are:

(a) unstable in air;
(b) unstable at high temperatures;
(c) brittle after doping;
(d) toxic because of the dopants; or
(e) intractable.

These problems are overcome or significantly reduced with the conductive oligomers of the present invention.

As used in describing the suitable diacid halides and diamines, "Schiff base" is used throughout this specification in a generic way rather than in its typical chemical way, and is used to represent conductive linkages, such as —CH=N—, oxazoles, thiazoles, imidazoles, or mixtures thereof. The heterocycle oligomers may simply need to be doped to exhibit semiconductive properties, and —CH=N— bonds may be unnecessary.

While conventional theory holds that semiconductive polymers should have (1) low ionization potentials, (2) long conjugation lengths, and (3) planar backbones, there is an inherent trade-off between conductivity and toughness or processability, if these constraints are followed. To overcome the processing and toughness shortcomings common with Schiff base, oxazole, imidazole, or thiazole polymers, the oligomers of the present invention, include "sulfone" (i.e., electronegative) linkages interspersed along the backbone providing a mechanical swivel for the rigid, conductive segments of the arms. Phenoxyphenylsulfone or phenoxyphenyl ketone moieties are preferred to provide added toughness.

The oligomers and blends of the present invention can be combined with reinforcing materials and cured to composite materials using heat or chemicals to activate crosslinking or interlinking between end caps. Prepregs can be prepared by conventional prepregging techniques. While woven fabrics are the typical reinforcement, the fibers can be continuous or discontinuous (in chopped or whisker form) and may be ceramic, organic, carbon (graphite), or glass, as suited for the desired application. Curing generally is conducted in conventional vacuum bagging techniques at elevated temperatures. The curing temperature varies with the choice of end cap. If desired, mixtures of end caps might be used.

HYPOTHETICAL EXAMPLES

1. Synthesis of Compound (a)

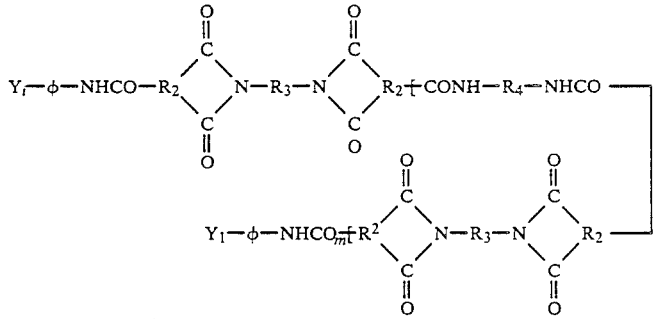

A diamine of the formula $H_2N-R_3-NH_3$ is reacted with two moles of an acid anhydride of the formula:

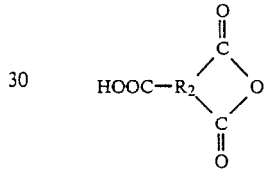

to form a dicarboxylic acid intermediate of the formula:

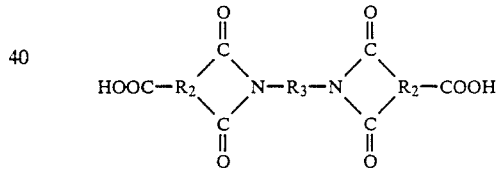

The intermediate is converted to the corresponding diacid chloride in the presence of $SOCl_2$, which is then condensed with one mole of a diamine of the formula $H_2N-R_4-NH_2$ and two moles of an amine end cap of the formula $Y_i-\phi-NH_2$ to yield the desired product.

If excess diamine of the formula $H_2N-R_4-NH_2$ is used along with an acid halide end cap of the formula $Y_i-\phi-COX$, the product can have the formula:

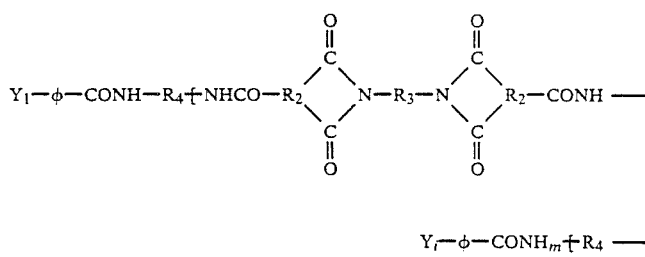

2. Synthesis of compound (b)

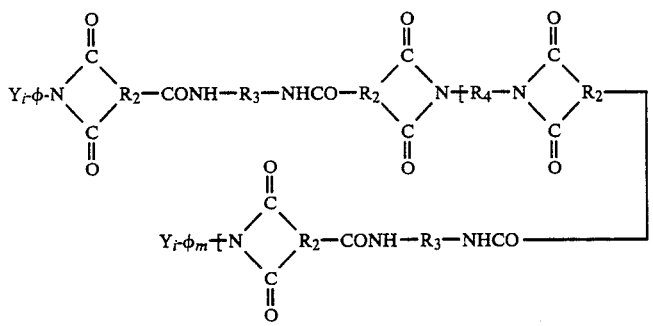

A diamine of the formula $H_2N-R_3-NH_2$ is reacted with

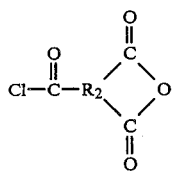

to yield a dianhydride intermediate of the formula:

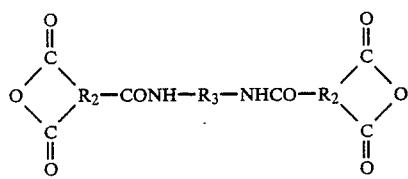

The intermediate is then condensed with $Y_i-\phi-NH_2$ and a diamine of the formula $H_2N-R_4-NH_2$ to yield the desired product.

3. Synthesis of compound (d)

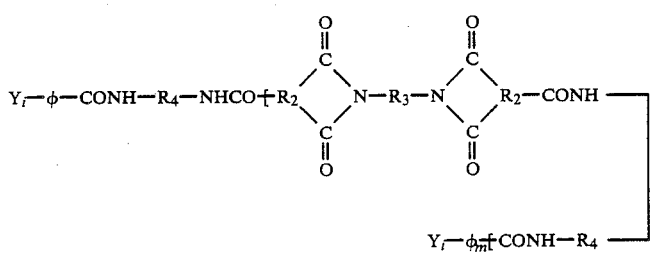

A diamine of the formula $H_2N-R_3-NH_2$ is reacted with an acid anhydride as in Example 1 to form a dicarboxylic acid intermediate that can be reacted with another diamine of the formula $H_2N-R_4-NH_2$ and an acid halide end cap of the formula $Y_i-\phi-COCl$ to yield the desired product.

4. Synthesis of compound (e)

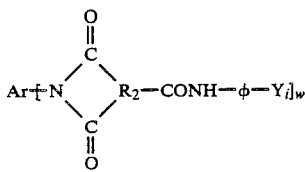

An aromatic hub like triaminobenzene is condensed with a phthalyl acid anhydride and an amine end cap to yield the desired product.

5. Synthesis of compound (f)

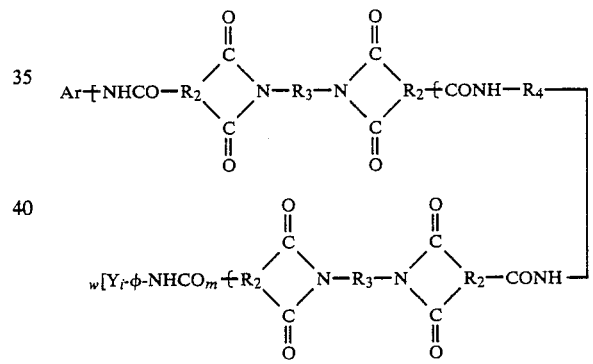

An amine-substituted hub like triaminobenzene, is reacted with the dicarboxylic acid intermediate of Example 1, a diamine of the formula $H_2N-R_4-NH_2$, and an amine end cap in the ratio of 1 mole of hub: (w)(m+1) moles of intermediate:(w)(m) moles of diamine:w moles of end cap to prepare the desired multidimensional product.

6. Synthesis of compound (g)

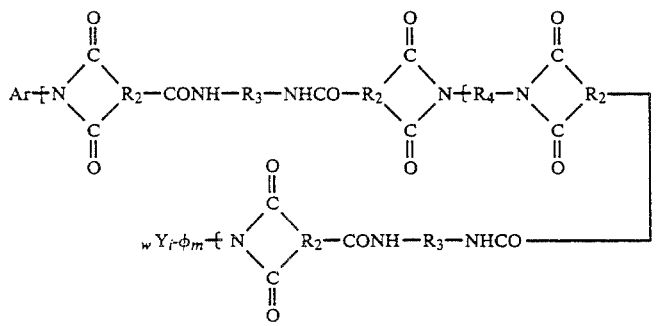

An aromatic amine hub is reacted with the dianhydride intermediate of Example 2, a diamine of the formula $H_2N-R_4-NH_2$, and an amine end cap on the ratio of 1 mole hub : (w)(m+1) moles dianhydride : (w)(m) moles diamine : w moles end cap to yield the desired product.

7. Synthesis of compound (h)

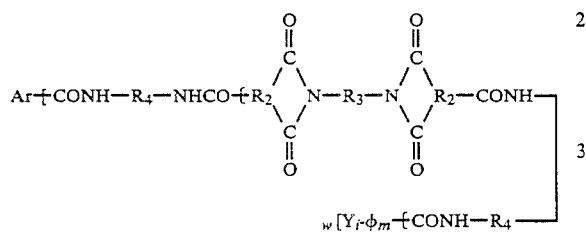

An aromatic acid or acid halide hub, like cyuranic acid, is reacted with a diamine of the formula $H_2N-R_4-NH_2$, a dicarboxylic acid intermediate of Example 1, and an acid halide end cap in the ratio of 1 mole hub: (w)(m+1) moles diamine : (w)(m) moles intermediate : w moles end cap to yield the desired product.

8. Synthesis of compound (i)

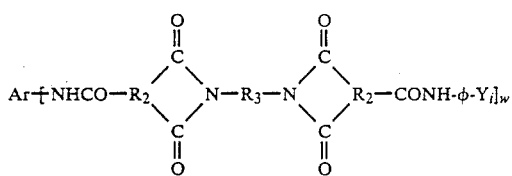

An aromatic amine hub is reacted with a dicarboxylic acid intermediate (or dihalide) of Example 1 and an amine end cap on the ratio of 1 mole hub : w moles intermediate : w moles cap to yield the desired product.

9. Synthesis of compound (j)

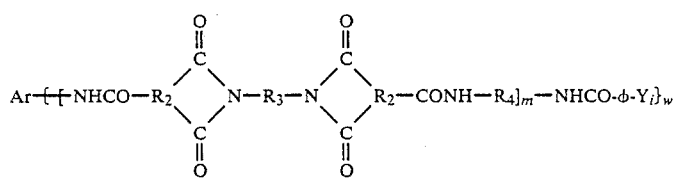

An aromatic amine hub is reacted with the intermediate of Example 8, a diamine, and an acid halide end cap in the ratio of 1 mole hub : w moles intermediate : w moles diamine, and w moles cap to form the desired product.

10. Synthesis of compound (k)

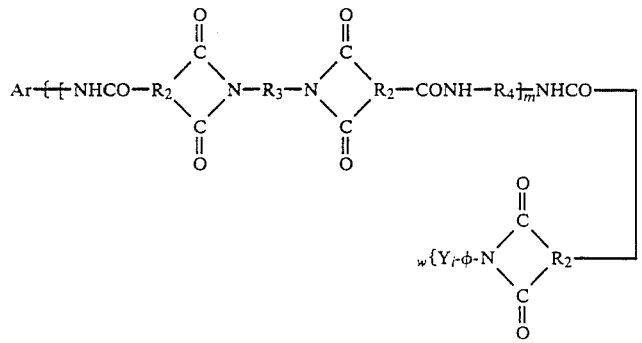

An aromatic amine hub is reacted with the intermediate of Example 1, a diamine of the formula $H_2N-R_4-NH_2$, and an acid or acid halide end cap of the formula:

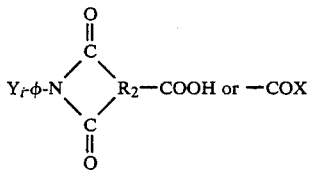

on the ratio of 1 mole hub : (w)(m) moles intermediate : (w)(m) moles diamine : w moles end cap to form the desired product.

The end cap is prepared by condensing an amine end cap of the formula: $Y_i$—$\phi$—$NH_2$ with an acid anhydride of the formula:

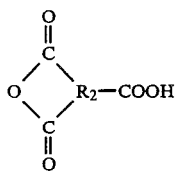

The acid halide is prepared from the acid in the presence of $SOCl_2$.

11. Synthesis of compound (l)

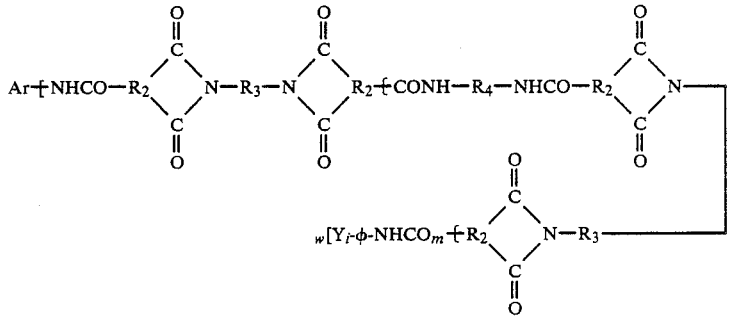

An aromatic amine hub is reacted with the dicarboxylic acid intermediate of Example 1, a diamine of the formula: $H_2N$—$R_3$—$NH_4$, and an amine end cap in the ratio of 1 mole hub : (w)(m+1) moles intermediate : (w)(m) moles diamine : w moles end cap to form the desired product.

12 Synthesis of compound (m)

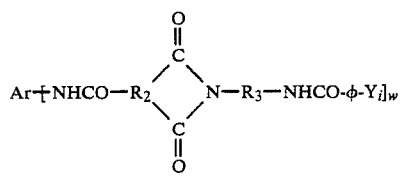

An aromatic amine hub is reacted with an acid halide anhydride of the formula

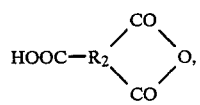

a diamine, and an acid halide end cap in the ratio of 1 mole hub : w moles acid halide anhydride : w moles diamine : w moles end cap to form the desired product. Preferably the reaction occurs in two steps with the reaction of the hub and acid halide anhydride followed by the addition of the diamine and end cap.

13. Synthesis of compound (n)

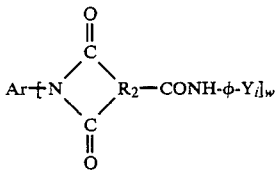

An aromatic amine hub is reacted with an acid anhydride of the formula:

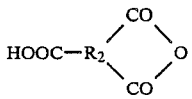

and an amine end cap on the ratio of 1 mole hub : w moles acid anhydride : w moles end cap to form the desired product.

14. Synthesis of compound (o)

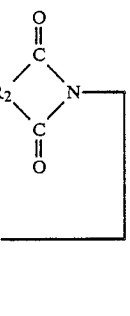

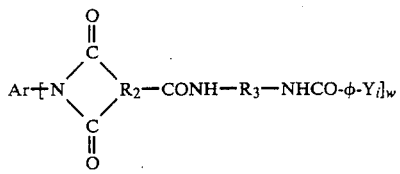

An aromatic amine hub is reacted with the acid anhydride of Example 13, a diamine of the formula $H_2N$—$R_3$—$NH_2$, and an acid halide end cap in the ratio of 1 mole hub : w moles acid anhydride : w moles diamine : w moles end cap to yield the desired product. Preferably the reaction occurs in two steps comprising the initial reaction between the hub and the acid anhydride with the subsequent simultaneous addition of the diamine and end cap.

15. Synthesis of compound (p)

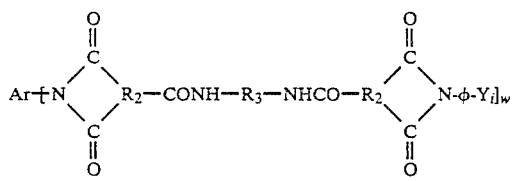

An aromatic amine hub is reacted with an acid anhydride of Example 13, a diamine of the formula $H_2N-R_3-NH_2$, and an amine end cap in the ratio of 1 mole hub: 2w moles acid anhydride: w moles diamine: w moles end cap to yield the desired product. Preferably the end cap and half of the acid anhydride are mixed to form an end cap conjugate of the formula:

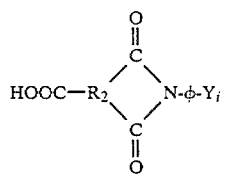

prior to mixing the reactants to form the oligomer. It also may be wise to mix the remaining acid anhydride with the hub to form an intermediate of the formula.

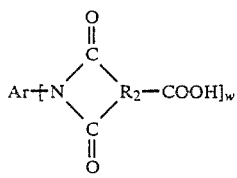

prior to adding the diamine and end cap conjugate.

Alternatively, the product can be made by reacting the hub with dianhydride intermediate of Example 2 and an amine end cap.

16. Synthesis of compound (q)

An aromatic amine hub is reacted with the intermediate of Example 2, a diamine of the formula: $H_2N-R_4-NH_2$, and an end cap conjugate formed by reacting an end cap amine with an acid halide anhydride of the formula:

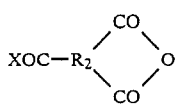

in the ratio of 1 mole hub: w moles intermediate: w moles end cap conjugate. The conjugate has the formula:

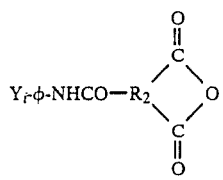

Alternatively, the product can be prepared by reacting the hub with an acid anhydride of the formula:

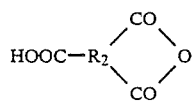

followed by reaction with an amine of the formula $H_2N-R_3-NH_2$, the intermediate of Example 1, and an amine end cap. Stepwise addition of the diamine to the extended hub followed by addition of the intermediate of Example 1 and amine end cap will reduce competitive side reactions.

17. Synthesis of compound (r)

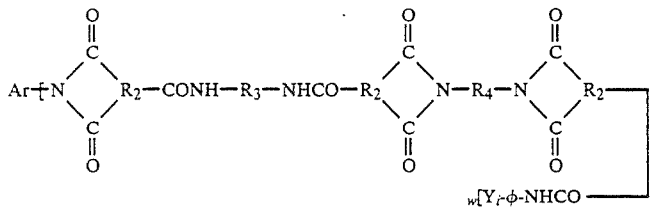

An aromatic amine hub is reacted with an acid anhydride of the formula:

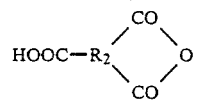

to form an acid hub intermediate which is reacted with a diamine of the formula $H_2N-R_3-NH_2$, a dicarboxylic acid or acid halide intermediate of Example 1, and an acid or acid halide end cap in the ratio of 1 mole hub intermediate: (w)(m+1) moles diamine: (w)(m) moles dicarboxylic acid intermediate: w moles end cap to yield the desired product.

Alternatively, the product can be formed by reacting an amine hub with the dianhydride intermediate of Example 2, a diamine of the formula $H_2N-R_3-NH_2$, and acid anhydride of the formula:

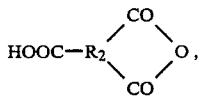

a second diamine of the formula $H_2N-R_3-NH_2$, and an acid halide end cap in a stepwise reaction.

18. Synthesis of compound (s)

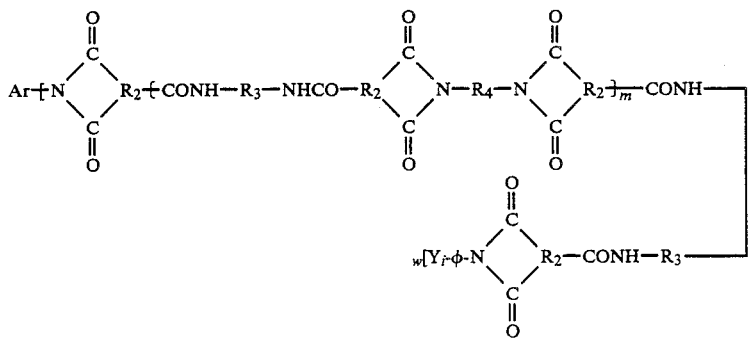

An aromatic amine hub is reacted with the dianhydride intermediate of Example 2, a diamine of the formula $H_2N-R_3-NH_2$, and an amine end cap in the ratio of 1 mole hub: 2 w moles intermediate: w moles diamine: w moles end cap to yield the desired product.

19. Synthesis of compound (t)

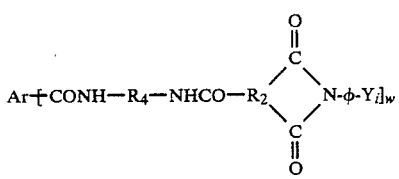

An aromatic acid hub is reacted with a diamine, an acid anhydride, and an amine end cap in the ratio of 1 mole hub: w moles diamine: w moles acid anhydride: w moles end cap to yield the desired product. Preferably the reaction includes the steps of reacting the acid anhydride with the end cap prior to addition of the hub and diamine.

20. Synthesis of compound (u)

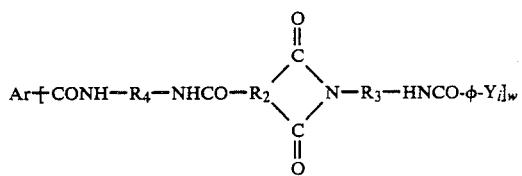

An aromatic acid hub is reacted with a diamine to form an amine extended hub conjugate that is reacted with an acid halide anhydride, another diamine, and an acid halide end cap to yield the desired product. Preparing an end cap conjugate by reacting the second diamine with the end cap prior to the addition of the other reactants reduces side or competitive reactions.

21. Synthesis of compound (v)

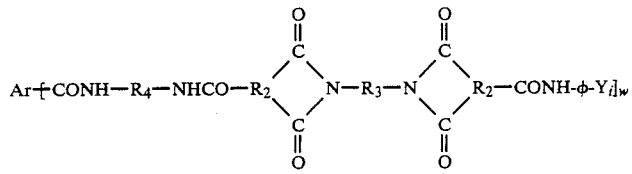

An aromatic acid hub is reacted with a daimine, the intermediate of Example 1, and an amine end cap in the ratio of 1 mole hub: w moles diamine: w intermediate: w moles end cap. Preferably, the reaction occurs in two stages with the hub being mixed with the diamine to form an amine conjugate to which the acid or acid halide intermediate and end cap is added simultaenously.

Comparable oligomers to those described in Examples 1–21 can be prepared by using the same diamine $H_2N-R_3-NH_2$ in the condensation reaction to prepare the intermediate acids or anhydrides and in the oligomeric condensation. That is, in these oligomers, $R_3$ is the same as $R_4$.

22. Synthesis of a multidimensional polyamide

The oligomer is prepared by reacting:

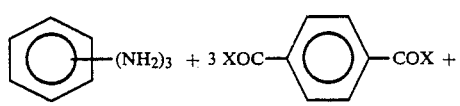

-continued

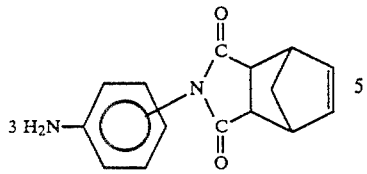

under an inert atmosphere to yield:

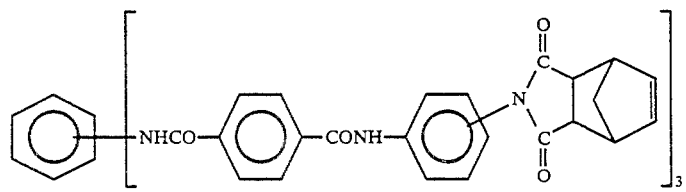

23. Synthesis of another polyamide

Another preferred multidimensional oligomer is prepared by reacting:

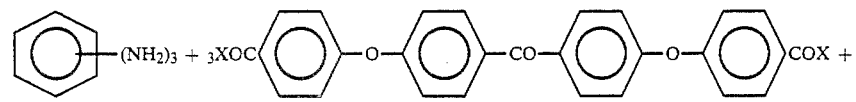

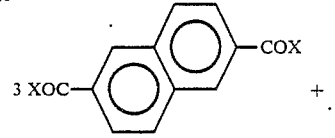

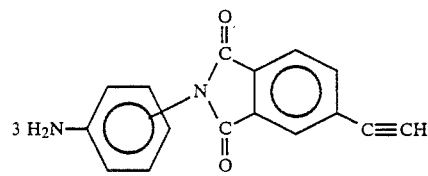

under an inert atmosphere to yield:

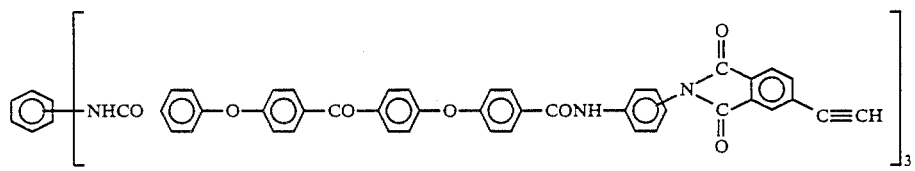

wherein q=—SO$_2$—, —CO—, —S—, or —(CF$_3$)$_2$C—, and preferably —SO$_2$— or —CO—

24. Synthesis of a difunctional, multidimensional polyamide

The oligomer is prepared by reacting:

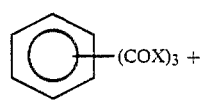

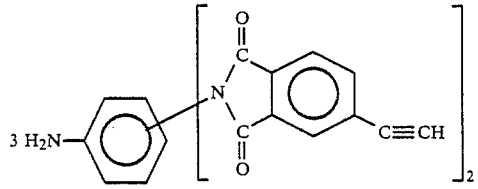

under an inert atmosphere to yield:

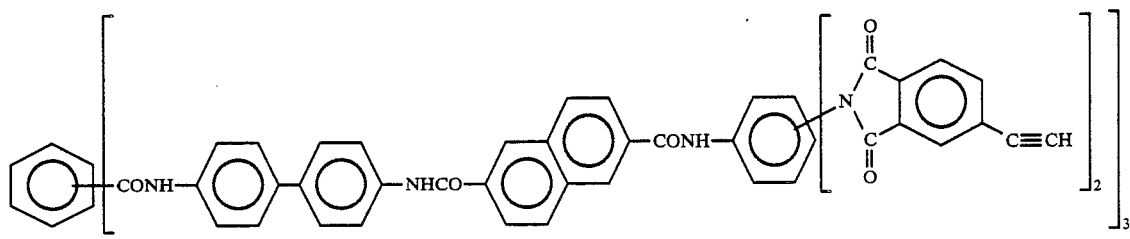

Competitive side reactions will likely hinder the yield of this product and will make isolation of the product difficult. Yield can be enhanced by adding the reactants serially, but the physical properties of the resulting oligomers might be impaired.

In Examples 22–24, the end cap monomer might be $A_2$—$NH_2$.

25. Synthesis using an etheramine hub

Yet another multidimensional oligomer is prepared by reacting:

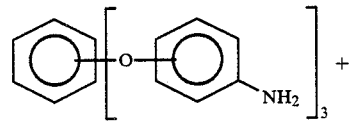

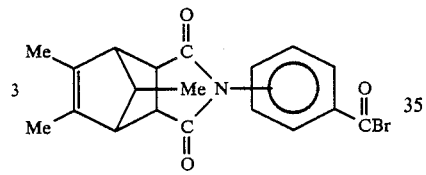

under an inert atmosphere to yield:

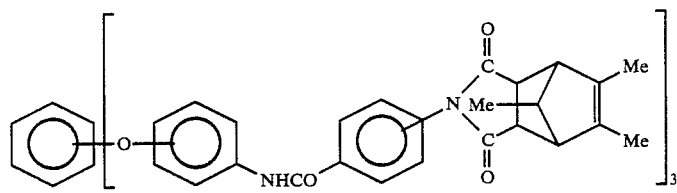

26. Synthesis of a multidimensional polyamide using anhydride end cap

The oligomer is prepared by reacting:

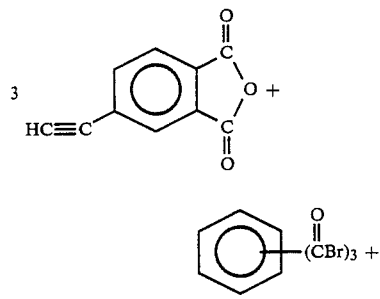

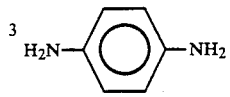

under an inert atmosphere to yield:

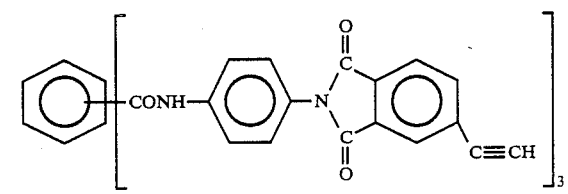

In Examples 25 and 26, the end cap monomer might be

27. Synthesis using melamine as a hub

The oligomer is prepared by reacting melamine with nadic anhydride to yield:

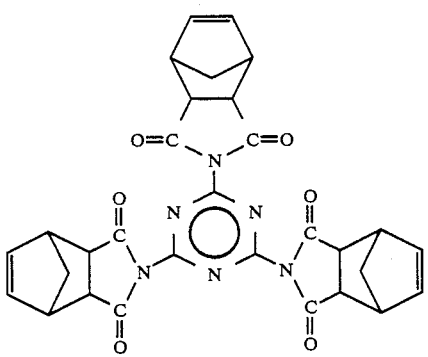

28. Synthesis of a polyamide having an acid halide hub, a diamine arms, and anhydride end caps The oligomer is prepared by reacting about 1 mole of

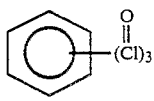

with about 3 moles of phenylenediamine and about 3 moles of

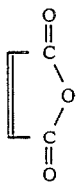

to yield primarily:

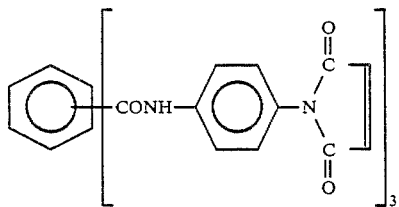

Better yield might be obtained by reacting the anhydride with aminobenzoic acid and converting the —COOH functionality to an amine followed by condensation of the monofunctional amine cap with the acid halide hub.

29. Preparation of an advanced composite blend

The polyamideimide oligomer of Example 1, wherein $R_2=R_3=R_4=$phenyl, $m=1$, $i=2$, and $Y=$

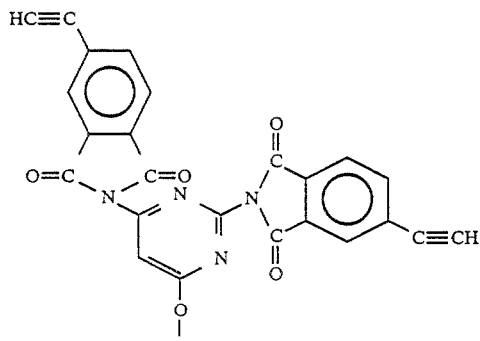

is dissolved in a suitable solvent.

A relative high average formula weight polyether polymer is made by condensing a dialcohol of the general formula:

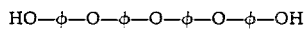

with Cl—φ—Cl and phenol (to quench the polymerization) under an inert atmosphere in the same solvent as used with the polyamideimide or another solvent miscible with that of the polyamideimide.

The two solutions are mixed to form the advanced composite blend, which can be prepregged or dried prior to curing to an advanced amideimide/ether composite.

30. Preparation of a multidimensional advanced composite blend

A multidimensional, polyether sulfone oligomer is prepared by reacting phloroglucinol with Cl—φ—Cl and a dialcohol of the general formula: HO—φ—O—φ—SO$_2$—φ—O—φ—OH. The polymerization is quenched with a pyrimidine-based end cap monomer. The condensation occurs in a suitable solvent under an inert atmosphere. The product is not recovered from the solvent.

A multidimensional, polyamide polymer is prepared in the same solvent as used for the oligomer or in another miscible solvent by condensing cyuranic acid chloride with aniline. The product is not recovered, but the reaction mixture is mixed with the polymer product to form a multidimensional advanced composite blend that can be prepregged or dried prior to curing to form a multidimensional, polyamide/polyethersulfone composite.

The oligomers or blends can also be used as varnishes, films, adhesives, and coatings.

While para isomerization is shown, other isomers are possible. Furthermore, the aryl groups can have substituents, if desired, such as halogen, lower alkyl up to about 4 carbon atoms, lower alkoxy up to about 4 carbon atoms, or aryl. Substituents may create steric hindrance problems in synthesizing the oligomers or in crosslinking the oligomers into the final composites.

While preferred embodiments have been described, those skilled in the art will readily recognize alterations, variations, or modifications which might be made to the embodiments without departing from the inventive concept. Therefore, the claims should be interpreted liberally with the support of the full range of equivalents known to those of ordinary skill based upon this description. The claims should be limited only as is necessary in view of the pertinent prior art.

We claim:

1. A difunctional end-cap monomer useful for preparing high performance oligomers, comprising:

wherein
$i=2$:
$Ar=$

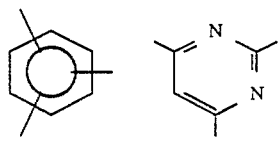

B=—OH or —X;
X=halogen;
Y=

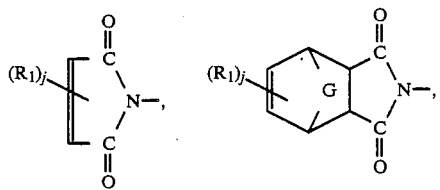 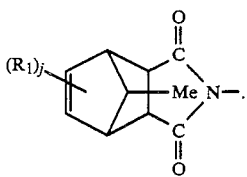

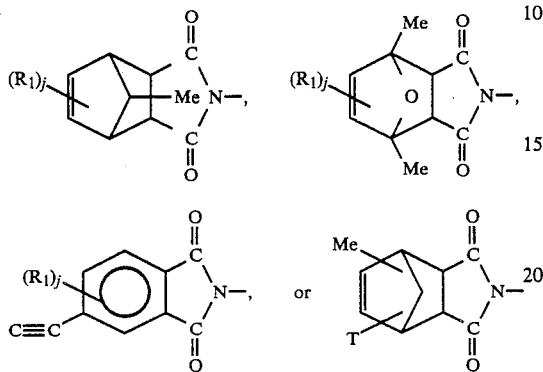

9. The monomer of claim 2 wherein Y is

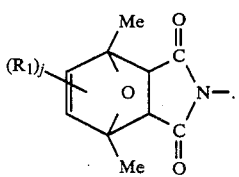

10. The monomer of claim 2 wherein Y is

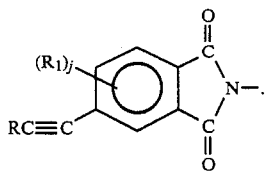

11. The monomer of claim 2 wherein Y is wherein
R₁=lower alkyl, lower alkoxy, aryl, aryloxy, substituted alkyl, substituted aryl, halogen, or mixtures thereof;
j=0, 1, or 2;
G=—CH₂—, —O—, —S—, —SO—, —CO—, —CHR—, —CR₂—, or —SO₂—;
T=methallyl or allyl;
Me=methyl; and
R=hydrogen, lower alkyl, or phenyl,
provided that R₁≠halogen, if B=halogen.

2. The monomer of claim 1 wherein Ar=

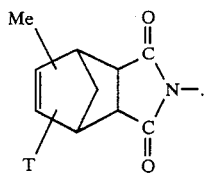

12. The monomer of claim 3 wherein Y is

3. The monomer of claim 1 wherein B=halogen.
4. The monomer of claim 2 wherein B=—OH.
5. The monomer of claim 2 wherein B=halogen.
6. The monomer of claim 2 wherein Y is

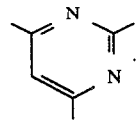

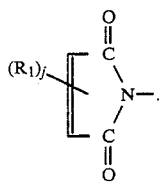

13. The monomer of claim 3 wherein Y is

7. The monomer of claim 2 wherein Y is

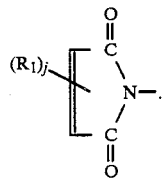

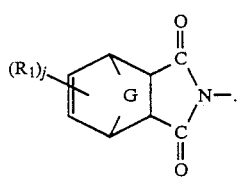

8. The monomer of claim 2 wherein Y is

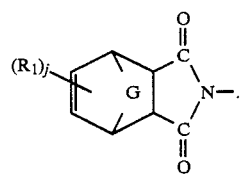

14. The monomer of claim 3 wherein Y is

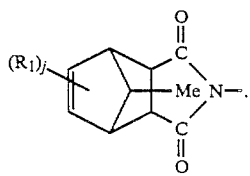
15. The monomer of claim 3 wherein Y is
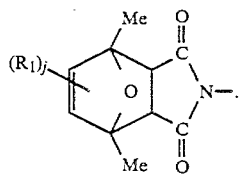
16. The monomer of claim 3 wherein Y is
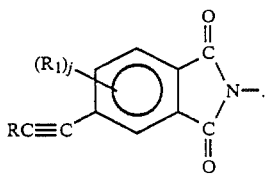
17. The monomer of claim 3 wherein Y is
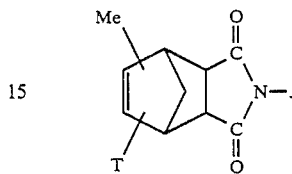
* * * * *

UNITED STATES PATENT AND TRADEMARK OFFICE
CERTIFICATE OF CORRECTION

PATENT NO. : 4,980,481

DATED : December 25, 1990

INVENTOR(S) : Hyman R. Lubowitz and Clyde H. Sheppard

It is certified that error appears in the above-identified patent and that said Letters Patent is hereby corrected as shown below:

Column 65, claim 1, line 23, "$C \equiv C$", should read ---$RC \equiv C$---.

Signed and Sealed this

First Day of September, 1992

Attest:

DOUGLAS B. COMER

Attesting Officer

Acting Commissioner of Patents and Trademarks